(12) United States Patent
Felt et al.

(10) Patent No.: US 12,447,024 B2
(45) Date of Patent: Oct. 21, 2025

(54) MOTION PRESERVING SYSTEM AND APPARATUS

(71) Applicant: Greenwood Medical L.L.C., Duluth, MN (US)

(72) Inventors: Jeffrey C. Felt, Duluth, MN (US); Mark A. Rydell, Bella Vista, AR (US); James B. Easley, Orono, MN (US); Matthew D. Hajicek, Maple Grove, MN (US); Andrew N. Smith, Maple Grove, MN (US)

(73) Assignee: Greenwood Medical L.L.C., Duluth, MN (US)

( * ) Notice: Subject to any disclaimer, the term of this patent is extended or adjusted under 35 U.S.C. 154(b) by 0 days.

(21) Appl. No.: 18/986,552

(22) Filed: Dec. 18, 2024

(65) Prior Publication Data

US 2025/0114212 A1  Apr. 10, 2025

Related U.S. Application Data

(63) Continuation-in-part of application No. PCT/US2024/034344, filed on Jun. 17, 2024.

(60) Provisional application No. 63/521,495, filed on Jun. 16, 2023.

(51) Int. Cl.
*A61F 2/44* (2006.01)
*A61F 2/30* (2006.01)

(52) U.S. Cl.
CPC .... *A61F 2/442* (2013.01); *A61F 2002/30004* (2013.01); *A61F 2002/30107* (2013.01); *A61F 2002/30112* (2013.01); *A61F 2002/30182* (2013.01); *A61F 2002/30387* (2013.01); *A61F 2002/30565* (2013.01); *A61F 2002/30604* (2013.01); *A61F 2002/444* (2013.01)

(58) Field of Classification Search
CPC ............ A61F 2002/448; A61F 2/442; A61F 2002/444; A61F 2/4415; A61F 2/4465
See application file for complete search history.

(56) References Cited

U.S. PATENT DOCUMENTS

| | | | |
|---|---|---|---|
| 4,309,777 A | 1/1982 | Patil | |
| 5,397,364 A * | 3/1995 | Kozak | A61B 17/025 606/247 |
| 5,458,642 A | 10/1995 | Beer et al. | |
| 6,143,031 A | 11/2000 | Knothe et al. | |
| 6,770,094 B2 | 8/2004 | Fehling et al. | |
| 7,122,055 B2 | 10/2006 | Ralph et al. | |

(Continued)

*Primary Examiner* — Matthew J Lawson
(74) *Attorney, Agent, or Firm* — Christensen, Fonder, Dardi & Busse PLLC; Douglas J. Christensen

(57) ABSTRACT

Systems, apparatuses and methods for preserving motion in an intervertebral disc. Modular disc implant segments can be constructed from a relatively rigid material with compressive spring lobes to act similar to an elastomer. The lobes may be configured to have a C-shaped outer wall and one or more spring arms, such as a leaf springs, to facilitate the modular disc implant segment's ability to compress, thereby enabling an entire intervertebral disc constructed from multiple modular disc implant segments to compress with the implant recipient's movement. The implant segments are sized to be inserted serially into a space defined by the annular fibrosus after removal of the nucleus pulposus with connections being made between adjacent segments in the space during the insertion process.

20 Claims, 16 Drawing Sheets

(56) References Cited

U.S. PATENT DOCUMENTS

| | | | |
|---|---|---|---|
| 7,267,690 B2 | 9/2007 | Felt | |
| 7,407,513 B2 | 8/2008 | Alleyne et al. | |
| 7,563,286 B2 | 7/2009 | Gerber et al. | |
| 7,628,814 B2 | 12/2009 | Studer et al. | |
| 7,931,688 B2 | 4/2011 | Landry et al. | |
| 8,038,718 B2 | 10/2011 | Palm et al. | |
| 8,057,546 B2 | 11/2011 | Studer et al. | |
| 8,100,977 B2 | 1/2012 | Felt | |
| 8,114,160 B2 | 2/2012 | Janowski et al. | |
| 8,277,508 B2 | 10/2012 | Trieu | |
| 8,282,641 B2 * | 10/2012 | Lopez | A61F 2/4611 |
| | | | 606/86 A |
| 8,377,138 B2 | 2/2013 | Reo et al. | |
| 8,480,742 B2 | 7/2013 | Pisharodi | |
| 8,795,375 B2 | 8/2014 | Malberg | |
| 8,911,498 B2 | 12/2014 | Bartish, Jr. et al. | |
| 9,265,617 B2 | 2/2016 | Buettner-Janz et al. | |
| 9,295,560 B2 | 3/2016 | Carpenter | |
| 9,364,338 B2 | 6/2016 | Malberg | |
| 9,498,349 B2 | 11/2016 | Patterson | |
| 9,737,414 B2 | 8/2017 | Felt et al. | |
| 10,390,959 B2 | 8/2019 | Yadin et al. | |
| 10,893,951 B2 | 1/2021 | Singh et al. | |
| 11,298,931 B2 | 4/2022 | Yadin et al. | |
| 2001/0016774 A1 * | 8/2001 | Bresina | A61F 2/4455 |
| | | | 623/17.15 |
| 2002/0128714 A1 | 9/2002 | Manasas et al. | |
| 2004/0010318 A1 * | 1/2004 | Ferree | A61F 2/442 |
| | | | 623/17.11 |
| 2005/0165485 A1 | 7/2005 | Trieu | |
| 2006/0004454 A1 * | 1/2006 | Ferree | A61F 2/38 |
| | | | 623/17.11 |
| 2006/0195191 A1 | 8/2006 | Sweeney, II et al. | |
| 2006/0276900 A1 | 12/2006 | Carpenter | |
| 2006/0293756 A1 * | 12/2006 | Felt | A61F 2/442 |
| | | | 623/17.11 |
| 2007/0010889 A1 * | 1/2007 | Francis | A61F 2/442 |
| | | | 623/17.11 |
| 2007/0168068 A1 | 7/2007 | Trieu | |
| 2007/0233261 A1 | 10/2007 | Lopez et al. | |
| 2008/0039942 A1 * | 2/2008 | Bergeron | A61F 2/442 |
| | | | 623/17.16 |
| 2008/0119853 A1 * | 5/2008 | Felt | A61F 2/4611 |
| | | | 606/103 |
| 2008/0133017 A1 * | 6/2008 | Beyar | A61F 2/4425 |
| | | | 623/17.14 |
| 2008/0167686 A1 * | 7/2008 | Trieu | A61F 2/442 |
| | | | 606/279 |
| 2008/0208343 A1 | 8/2008 | Felt | |
| 2008/0249622 A1 * | 10/2008 | Gray | A61F 2/4455 |
| | | | 606/86 A |
| 2009/0138086 A1 * | 5/2009 | Dewey | A61F 2/44 |
| | | | 623/17.16 |
| 2009/0157185 A1 | 6/2009 | Kim | |
| 2009/0192617 A1 | 7/2009 | Arramon et al. | |
| 2009/0210063 A1 | 8/2009 | Barrett | |
| 2009/0270986 A1 * | 10/2009 | Christensen | A61F 2/4611 |
| | | | 623/17.14 |
| 2009/0270989 A1 | 10/2009 | Conner et al. | |
| 2009/0276047 A1 | 11/2009 | Felt et al. | |
| 2010/0057144 A1 | 3/2010 | Felt et al. | |
| 2011/0040383 A1 | 2/2011 | Wurfel | |
| 2013/0245770 A1 * | 9/2013 | Felt | A61F 2/4455 |
| | | | 623/17.16 |
| 2016/0361177 A1 * | 12/2016 | Biedermann | A61F 2/442 |
| 2019/0282375 A1 * | 9/2019 | Kyle | A61F 2/447 |
| 2020/0015979 A1 | 1/2020 | Arramon | |
| 2021/0186707 A1 | 6/2021 | Hsieh | |
| 2023/0277327 A1 | 9/2023 | Felt et al. | |

* cited by examiner

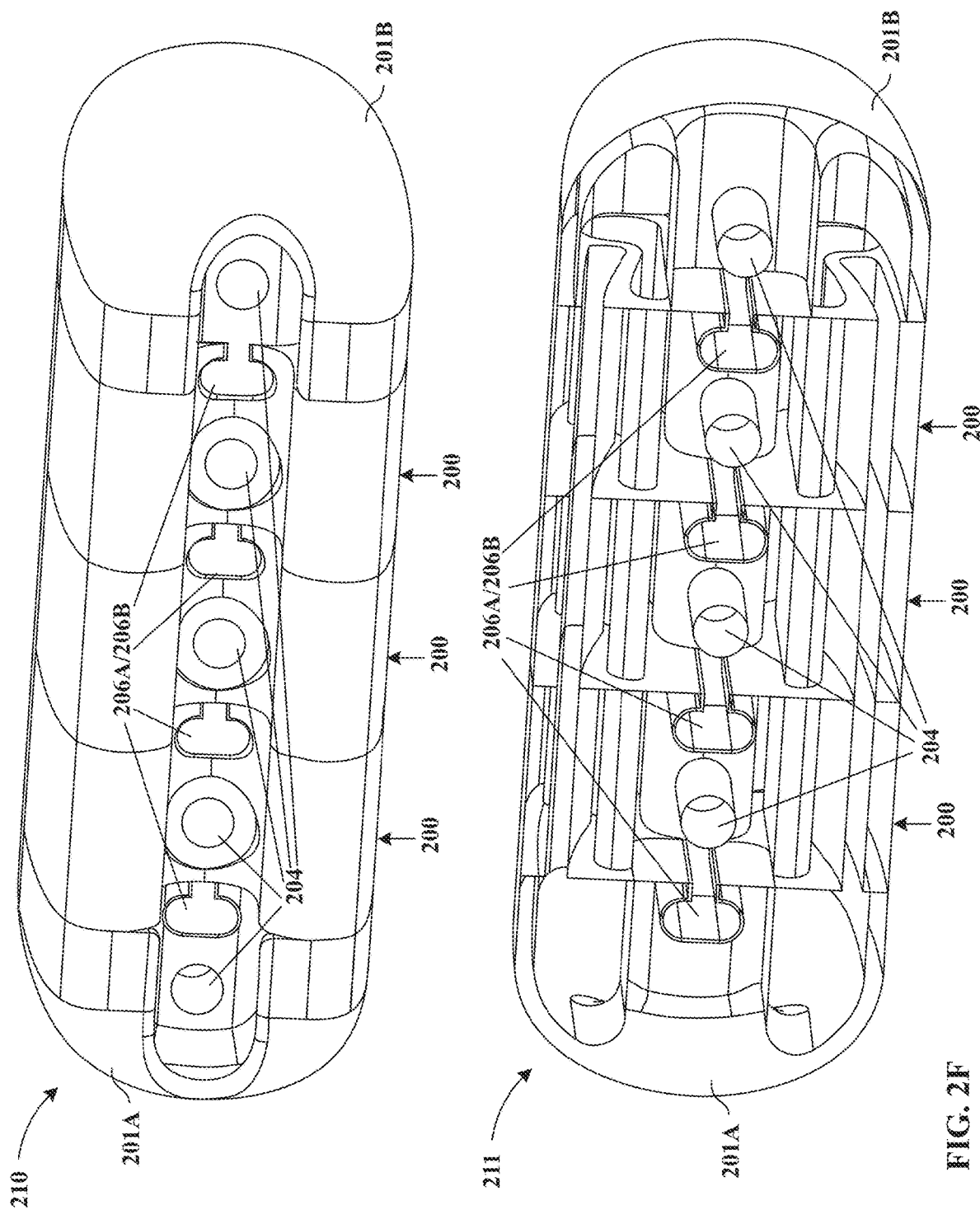

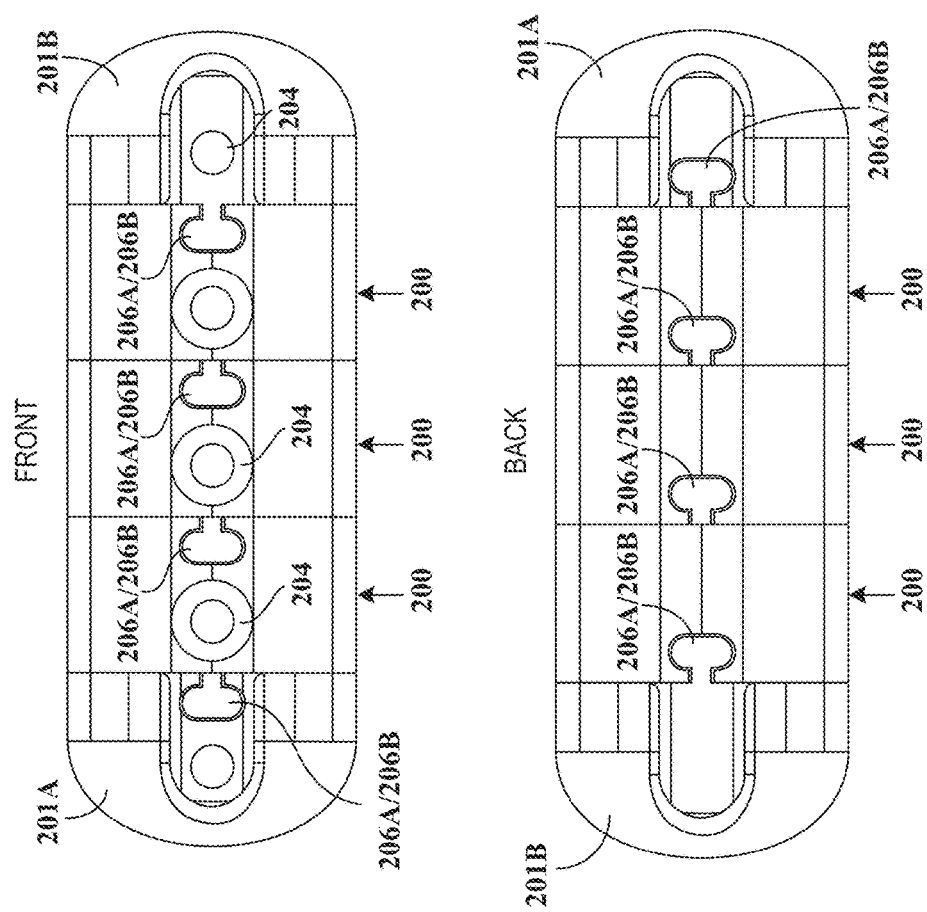
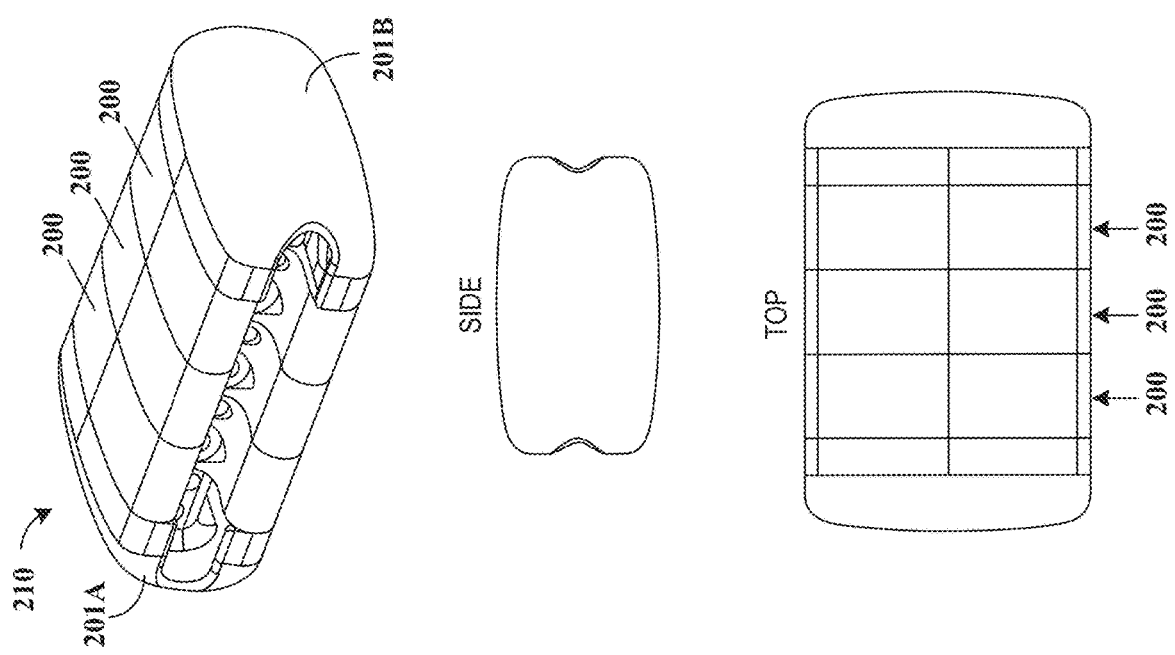
FIG. 2G

SECTION A-A
SCALE 2:1

MOTION PRESERVING SYSTEM AND APPARATUS

RELATED APPLICATIONS

This application is a bypass continuation-in-part of PCT/US2024/034344 filed on Jun. 17, 2024, PCT/US2024/034344 which claims the benefit of U.S. Provisional Patent Application No. 63/521,495, filed on Jun. 16, 2023, pursuant to 35 U.S.C. § 119(e). Both applications are incorporated herein by reference in their entirety.

FIELD

This disclosure relates generally to medical motion preserving systems, devices, and methods, including disc nucleus replacement systems and apparatuses such as implantable prostheses for repairing intervertebral discs.

BACKGROUND

The spinal motion segment consists of a unit of spinal anatomy including the two vertebral bodies, the interposed intervertebral disc, as well as the attached ligaments, muscles, and the facet joints. The disc consists of the end plates at the top and bottom of the vertebral bones, the soft inner core called the nucleus pulposus, and the annulus fibrosus running circumferentially around the nucleus. In normal discs, the nucleus pulposus cushions applied loads, thus protecting the other elements of the spinal motion segment. A normal disc nucleus responds to compression forces by transferring these forces against the vertebral end plates and the annulus fibrosus. The annulus consists of collagen fibers and a smaller number of elastic fibers, both of which are effective in resisting tension forces. However, the annulus on its own is not very effective in withstanding compression shear forces, and in the absence of a functioning nucleus it loses its ability to maintain physiologic vertebral body separation. The result is compression and irritation of exiting nerve roots and development of back pain.

As people age, the intervertebral discs often degenerate naturally. Degenerative disc disease of the spine is one of the most common conditions causing pain and disability in our population. Disc degeneration occurs when the nucleus dehydrates. When a nucleus dehydrates, its ability to act as a cushion is reduced. Because the dehydrated nucleus is no longer able to bear loads, the loads are transferred to the annulus and to the facet joints. The annulus and facet joints are not capable of withstanding their increased share of the applied compression and torsional loads, and as such, they gradually deteriorate. As the annulus and facets deteriorate, many other effects ensue, including the narrowing of the interspace, bony spur formation, fragmentation of the annulus, fracture and deterioration of the cartilaginous end plates, and deterioration of the cartilage of the facet joints. The annulus and facet joints lose their structural stability, subtle but pathologic motions occur between the spinal bones.

Breakdown products of the disc, including macroscopic debris, microscopic particles, and noxious biochemical substances build up. The particles and debris may produce nerve compression and sciatica, and the noxious biochemical substances can irritate sensitive nerve endings in and around the disc and produce low back pain. Affected individuals experience muscle spasms, reduced flexibility of the low back and pain when ordinary movements of the trunk are attempted.

Degeneration of a disc is irreversible. In some cases, the body will eventually stiffen the joints of the motion segment, effectively re-stabilizing the discs. Even in the cases where re-stabilization occurs, the process can take many years and patients often continue to experience disabling pain. Extended painful episodes of longer than three months often lead patients to seek a surgical solution for pain.

Several methods have been devised to attempt to stabilize the spinal motion segment. Some of the methods include: Heating the annular region to destroy nerve endings and strengthen the annulus; Applying rigid or semi-rigid support members on the sides of the motion segment or within the disc space; and Removing and replacing the entire disc with a generally rigid plastic, articulating artificial device; removing permanently and fusing the vertebrae adjacent to the affected disc.

Until recently, spinal fusion has generally been regarded as the most effective surgical treatment to alleviate back pain due to degeneration of a disc. While this treatment is often effective at relieving back pain, all discal motion is lost in the fused spinal motion segment.

The loss of motion in the affected spinal segment necessarily limits the overall spinal mobility of the patient. Ultimately, the spinal fusion places greater stress on the disc adjacent to the fused segment as these segments attempt to compensate for lack of motion in the fused segment, often leading to early degeneration of these adjacent spinal segments.

Current developments are focusing on treatments that can preserve some or all of the motion of the affected spinal segment. One of these methods to stabilize the spinal motion segment without the disadvantages of spinal fusion is total disc replacement. Total disc replacement is a highly invasive and technically demanding procedure which accesses the disc from anterior or frontal approach and includes dividing the anterior longitudinal ligament, removing the cartilaginous end plates between the vertebral bone and the disc, large portions of the outer annulus and the complete inner nucleus. Then an artificial total disc prosthesis is placed in the evacuated disc space. Many of the artificial total disc replacements currently available consist of a generally rigid plastic such as ultra-high molecular weight polyethylene ("UHMWPE") as the nucleus that is interposed between two metal plates that are anchored or attached to the vertebral endplates.

A summary of the history of early development and designs of artificial discs is set forth in "Ray, The Artificial Disc: Introduction, history and Socioeconomics", Chpt. 21, *Clinical Efficacy and Outcome in the Diagnosis of Low Back Pain*, pgs. 205-225, Raven Press (1992).

These types of artificial total discs have several disadvantages. First, because the artificial disc replacements are relatively large, they require relatively large surgical exposures to accommodate their insertion. The larger the surgical exposure, the higher the chance of infection, hemorrhage or even morbidity. Also, to implant the prosthetic, removal of a large portion of the annulus reduces the stability of the motion segment, at least until healing occurs around the artificial disc. Further, because the devices are constructed from rigid materials, they can cause serious damage if they were to displace from the disc space and contact local nerve or vascular tissues. Another disadvantage is the rigid artificial disc replacements do not reproduce normal disc biomechanics.

An alternative to total disc replacement is nucleus replacement which, like an artificial disc prosthesis, are inert, non-rigid, non-biological replacements. Some prior art nucleus replacements utilize hydrogels because of their water imbibing properties that enable these replacements to expand in situ to permit a more complete filling of the evacuated nucleus cavity. However, there is usually a trade-off in that the more expansion the hydrogel achieves, the less structural support the implant can provide. As a result, many hydrogel nucleus disc replacements have generally adopted the use of some form of a jacket or fabric to constrain the hydrogel material. Without the jacket or other form of constraint, the hydrogel is susceptible to displacement because of the slippery nature of hydrogel. Unfortunately, the jacket or fabric shell will be subject to long term abrasive wear issues that could result in failure of the jacket or shell's ability to constrain the hydrogel and thus the hydrogel may be subject to displacement.

Another less desirable approach to nucleus replacement involves implantation of a balloon or other container into the nucleus, which is then filled with a biocompatible material that hardens in-situ. Among the problems with this approach is that the chemical hardening process is exothermic and can generate significant amounts of heat that may cause tissue damage. In addition, if there is a leakage of material into the disc cavity and surrounding tissues, this may cause undesirable complications. Also, in-situ cured polymers often require very toxic monomers that could leak into the patients' tissue and even into their blood stream causing serious harm. Many of the monomers are known carcinogens.

Another technique for nucleus replacement involves implanting a multiplicity of individual support members, such as beads, one at a time in the evacuated disc nucleus cavity until the cavity is full, such as described in U.S. Pat. Nos. 5,702,454 and 5,755,797. Because they are small, there is a possibility that one or more of the beads may extrude out of the evacuated disc nucleus cavity. From a mechanical perspective, this technique is limited in the ability to produce consistent and reproducible results because the location and interaction of the multiplicity of beads or support members can shift during and after implantation.

More recent attempts for a nucleus prosthesis involve using multiple elastomer pieces that results in an all-elastomeric composition, such as in U.S. Pat. No. 8,100,977.

However, the polymer-polymer interface produced significant difficulties with implantation because the friction at the polymer-polymer interlock made implantation very difficult for the surgeons and secure locking of the modules was often unattainable. Additionally, the elastomeric material experiences contraction over time and loses some of its distraction capability. This undesirable behavior of many elastomers is called compression set. Such prior art further describes other solutions, one involving an elastomeric outer shell and inner hard material to allow sliding and locking of the modules, where the problems of modulus mismatch made this approach unstable biomechanically. A second approach with soft inner (hydrogel) and stiff outer shell would separate and dislocate.

Accordingly, there is a need, among other things, for a nucleus prosthesis that may be inserted using a minimally invasive procedure and that mimics the characteristics of a natural disc. The present disclosure describes systems, apparatuses and methods to address these and other shortcomings of the prior art.

SUMMARY

The present disclosure is directed to medical motion-preserving systems, apparatuses and methods. Embodiments include implantable spinal prostheses for repairing intervertebral discs. In embodiments, such implantable prostheses include interconnected modular disc nucleus implants.

In embodiments, an assemblage of interconnectable modular disc implant segments may be assembled in a laterally extending row in a annulus fibrosis of a human spine after removal of the nucleus pulposus. In embodiments, the interconnectable modular disc implant segments may include end implant segments and intermediate implant segments. The intermediate implant segments may have a central base portion, a superior compressible spring lobe unitary with and extending upwardly from the central base portion, and an inferior compressible spring lobe unitary with and extending downwardly from the central base portion. The two lobes may be mirror images or identical to each other. Each compressible spring lobe may have an exterior wall portion defining the shape of the lobe and providing an open interior within the wall portion. Spring members may extend from the wall portion or central base portion within the open interior with the connection comprising living hinges.

In embodiments, a disc nucleus replacement assemblage for insertion and for assembly in a laterally extending row within an annulus fibrosis of a human spine after removal of the nucleus pulposus has a plurality of modular disc implant segments, including intermediate implant segments having a central base portion formed of a polymer with a Youngs Modulus of greater than 3.0 GPa, the central base portion having an interconnecting portion for connecting to an adjacent disc implant segment, and a threaded hole for receiving an implant tool, a superior compressible spring lobe unitary with and extending upwardly from the central base portion, the superior compressible spring lobe formed of the polymer with a Youngs Modulus of greater than 3.0 GPa, the superior compressible spring lobe unitary with the base portion, and an inferior compressible spring lobe unitary with and extending downwardly from the central base portion, the superior compressible spring lobe formed of the polymer with a Youngs Modulus of greater than 3.0 GPa, the inferior compressible spring lobe unitary with the base portion.

In embodiments, each of the compressible spring lobes having a respective C-shaped exterior wall portion defining an open interior, each the exterior wall portion having an exteriorly facing wall surface and an interiorly facing wall surface, each of the compressible spring lobes further having a plurality of spring members within the open interior resisting axial compression of the respective spring lobe by resistance in bending and/or compression and/or elongation.

In embodiments, one or more modular disc implant segments formed of relatively rigid material(s), for example having a Young's Modulus greater than 3.0 GPa, and configured in a manner to cause it to act like or otherwise assume certain characteristics of a solid substance exhibiting at least compressibility and resiliency, without utilizing an elastomer. For example, the material may be configured to include one or more spring members that resist compressibility.

In embodiments, any one or more of the modular disc implant segments includes a homogeneous material, such as a biocompatible polymer, metal, etc., where that solid material includes one or more spring members defined by voids to enable the solid material to be compressed when pressure is applied thereto. The solid material may be configured to exhibit elastic recovery characteristics to enable the respective modular disc implant segment to recover from the compression in order to partially or fully return to the original shape of the structural void(s), and therefore return the compressed modular disc implant segment(s) to its original geometric profile. In this manner, such modular disc implant segments can mimic or otherwise simulate the natural elastic properties of a healthy nucleus pulposus, and thereby serve as an implantable prosthesis for repairing damaged intervertebral discs.

While a single or multiple modular disc implant segments may be used as the implantable prosthesis for repairing damaged intervertebral discs, one embodiment involves assembling a plurality of modular disc implant segments into a unitary compressible and resilient replacement of an extracted nucleus pulposus within the annulus fibrosus. The modular implant segments may be inserted through an access orifice created in the intervertebral disc, such as through the annulus fibrosus. Each of the modular implant segments may be sequentially inserted into the disc space created by an extracted nucleus pulposus, by way of an access orifice(s) to the disc space, with each of the second through last inserted modular implant segments respectively connecting (or substantially locking) to the adjacent modular implant segment whose insertion immediately preceded it.

In such an example, the end result is a unitary prosthesis that replaces the extracted nucleus pulposus and has compressibility and resiliency characteristics resembling a healthy nucleus pulposus, due at least to the appropriately configured modular disc implant segments utilizing bendable spring members.

Therefore, embodiments described herein include representative examples of connectable (and in some cases interlockable) modular disc implant segments capable of being formed in situ into a mimetic nucleus pulposus device that exhibits certain elastomeric properties substantially commensurate with that of a healthy nucleus pulposus, to restore an intervertebral disc to a simulated pre-impaired state.

One embodiment is directed to a modular connectable segment that can be assembled in situ with one or more other such modular connectable segments to ultimately provide an implanted intervertebral disc prosthesis, where the modular connectable segment is constructed from a generally non-elastic material that is compressible into one or more integrated spaces or voids. In one particular embodiment, a modular disc implant segment is provided that includes spring members or portions defined by gaps, openings, slits, or other structural voids to facilitate compression of the implant segment in response to an external force, where the implant segment is configured to return towards its original geometric shape in response to diminution of the external force.

In accordance with one embodiment, a disc nucleus replacement apparatus is provided that includes a plurality of modular disc implant segments, where at least one of the implant segments includes spring members that flex and resist but facilitate compression of the implant segment(s) in response to an external force, and where the implant segment(s) is configured to return towards its original geometric shape in response to diminution of the external force. An attachment mechanism is provided on each of the implant segments to facilitate connection of each of the implant segments to at least one other implant segment. The disc nucleus replacement apparatus comprises a unitary structure of connected implant segments.

In another embodiment of such a disc nucleus replacement apparatus, an open interior has therein one or more spring members, such as leaf-springs.

In another embodiment, an open interior has a spring member spanning the open region connected to a exterior wall portion and/or a central base portion.

Embodiments of such a disc nucleus replacement apparatus may involve constructing each of the modular disc implant segments from polyether ether ketone (PEEK). In still other embodiments, the modular disc implant segments are constructed from a titanium alloy.

Such a disc nucleus replacement apparatus may further include an implant segment connection mechanism configured to couple to the implant segment connection mechanism of at least one adjacent one of the modular disc implant segments. In a more particular example of such a disc nucleus replacement apparatus, the implant segment connection mechanism includes both a tongue element and groove, where the groove is configured to facilitate a slip fit connection by receiving the tongue element from an adjacent modular disc implant segment. In yet another particular example of such a disc nucleus replacement apparatus, the implant segment connection mechanism includes either a tongue element or groove, where the tongue element or groove on one modular disc implant segment is configured to facilitate a slip fit connection by connecting to the mating tongue element or groove in an adjacent modular disc implant segment. In embodiments, cooperating connection portions may be configured as a dovetail joint.

The nucleus replacement apparatus may include modular disc implant segments that respectively include a tool connection mechanism capable of releasably connecting to an installation instrument.

In another embodiment of such a disc nucleus replacement apparatus, the structural voids are arranged in a symmetrical manner within at least one of the modular disc implant segments, where in other embodiments the structural voids are arranged in an asymmetrical manner within at least one of the modular disc implant segments. In one embodiment, the structural voids include a top set of structural voids and a bottom set of structural voids separated by a less compressible central portion.

Yet another embodiment of such a disc nucleus replacement apparatus further includes termination modular disc implant segments, having a different arrangement of structural voids than the other implant segments.

Another embodiment involves a method for implanting an intervertebral disc prosthesis in a patient. The method includes implementing a plurality of modular disc implant segments, each having a plurality of structural voids to facilitate compression of the modular disc implant segments in response to an external force, and each constructed of a material configured to return towards its original geometric shape in response to diminution of the external force. The method includes implanting a first modular disc implant segment. In connection with implanting a second modular disc implant segment, the second modular disc implant segment is connected to the first modular disc implant segment using a connection mechanism provided on each of the first and second modular disc implant segments. The method further includes implanting a last modular disc implant segment to form an aggregate intervertebral disc prosthesis in situ in the patient.

Another embodiment of such a method further includes implanting one or more additional ones of the modular disc implant segments between the first and last ones of the modular disc implant segments by way of their respective connection mechanisms.

In another embodiment, each of the modular disc implant segments is constructed from polyether ether ketone (PEEK).

Another embodiment of such a method further includes connecting an insertion tool to a connection receptacle on the second modular disc implant segment to facilitate its insertion into a disc space within the annulus fibrosus, and disconnecting the insertion tool from the connection receptable on the second modular disc implant segment when the second modular disc implant segment has been connected to the first modular disc implant segment via their respective connection mechanisms.

In another embodiment, a disc nucleus replacement implant is provided that includes a leaf spring arrangement to provide the necessary compressibility to mimic the native nucleus pulposus to allow motion between adjacent vertebrae.

In another embodiment of the disc nucleus replacement implant, the spring leaf elements of the implant's leaf spring arrangement remain connected to a main body of the implant to form the open channel, but through a series of arch spring constructs provide compressibility in flexion, extension, and lateral bending of the vertebral motion segment.

In one embodiment, the leaf spring arrangement includes a combination of open and closed leaf spring elements configured to optimize the flexibility of the implant in all vertebral motions.

Embodiments of such a disc nucleus replacement implant involve utilizing a material of the disc nucleus replacement implant that has a hardness or compression modulus similar to bone.

In still another embodiment of such a disc nucleus replacement implant, the disc nucleus replacement implant comprises two or more modules to allow separate insertion of each of the two or more modules through a pathway in the annulus fibrosus.

In a more particular embodiment of such a disc nucleus replacement implant, a non-elastomeric material is configured with one or more movable leaf springs that are connected to, but separated from, the body of the implant by an open channel such that the implant, as a whole, is compressible. In yet another particular embodiment of such a disc nucleus replacement implant an open anterior channel ends posteriorly in an enlarged, generally circular space to improve the compressibility of the leaf spring arrangement. In an alternative particular embodiment, an open posterior channel ends anteriorly in an enlarged, generally circular space to improve the compressibility of the leaf spring arrangement.

In another embodiment of such a disc nucleus replacement implant utilizing the movable leaf springs, each of the modules have channels in a Z configuration with a first open end on the upper channel facing posterior, and a second open end of the lower channel facing anterior. In an alternative embodiment, each of the modules have channels in a Z configuration with a first open end on the lower channel facing posterior, and a second open end of the upper channel facing anterior.

In another embodiment of such a disc nucleus replacement implant utilizing the movable leaf springs, two or more leaf springs are configured in each of a plurality of modules connected to form the disc nucleus replacement implant.

In other embodiments of such a disc nucleus replacement implant utilizing the movable leaf springs, the material of the disc nucleus replacement implant is PEEK, (polyether ether ketone). In another embodiment, the material of the disc nucleus replacement implant comprises a thermoplastic, where in still other embodiments the material comprises a composite of elastomer and thermoplastic. In another embodiment, the material of the disc nucleus replacement implant comprises an elastomer, where in still another embodiment the material of the disc nucleus replacement implant comprises metal. In yet another embodiment, the material of the disc nucleus replacement implant comprises a composite of metal and polymer (elastomeric or thermoplastic). The implant may be configured for insertion through Posterior Lumbar Interbody Fusion (PLIF), Transforaminal Lumbar Interbody Fusion (TLIF), and for lateral approaches. In still another embodiment, modules forming the disc nucleus replacement implant are inserted using a sequential dilator and distraction instrument.

In yet another embodiment, a device is provided for creating space between two adjacent vertebral bodies, comprising several progressively larger members placed coaxially to distend the annulus fibrosis and put force on the vertebral endplates to affect increased separation, wherein a final member in the sequence is sized to provide the desired endplate separation and have an internal dimension through which to pass instruments and an interbody implant module.

In still another embodiment, a vertebral disc nucleus replacement apparatus is provided that includes one or more structural voids within a substantially non-elastomeric component, where the structural voids facilitate compressibility of the substantially non-elastomeric component proximate the one or more structural voids when arranged within the vertebral disc as a replacement to an original nucleus pulposus.

A feature and advantage of embodiments herein over the prior art, specifically where solid bodies, such as elastomeric or rigid polymers are utilized is the ability to tailor the spring rate, maximum compressions, and behavior over the range of deflection via geometry rather than material properties.

A feature and advantage of embodiments herein over the prior art, is the designer's ability to tailor the mechanical behavior independent of the overall size of the device. An elastomer's mechanical properties are a function of the overall size of the part.

A feature and advantage of embodiments herein over the prior art, is the designer's ability to add features for assembly such that require rigid structures, such as threads and dovetails that are not possible or easily accomplished in elastomers or less rigid polymers, such as PEEK.

A feature and advantage of embodiments herein over the prior art, is the ability to control the flexion behavior in different motions as desired e.g. force straight down vs forward, rearward to the side or other directions.

A further feature and advantage of embodiments herein is that components may be formed conventionally in relatively inexpensively in conventional molding or machining operations, elastomers and composite designs are not as conducive to these conventional manufacturing processes.

This summary serves as an abbreviated, selective introduction of a representative subset of various concepts and embodiments that are further described or taught to those skilled in the art in the disclosure herein. This summary is not intended to refer to all embodiments, scopes, or breadths of claims otherwise supported by the Specification, nor to identify essential features of the claimed subject matter, nor to limit the scope of the claimed subject matter.

BRIEF DESCRIPTION OF THE DRAWINGS

FIG. 2F is an example of a constructed intervertebral disc nucleus prosthesis formed by a plurality of connected modular disc implant segments.

FIG. 2G depicts some of the faces of the representative intervertebral disc nucleus prosthesis 210.

FIG. 2I depicts another embodiment of a constructed intervertebral disc nucleus prosthesis formed by a plurality of connected modular disc implant segments.

DETAILED DESCRIPTION

Figure 1A:
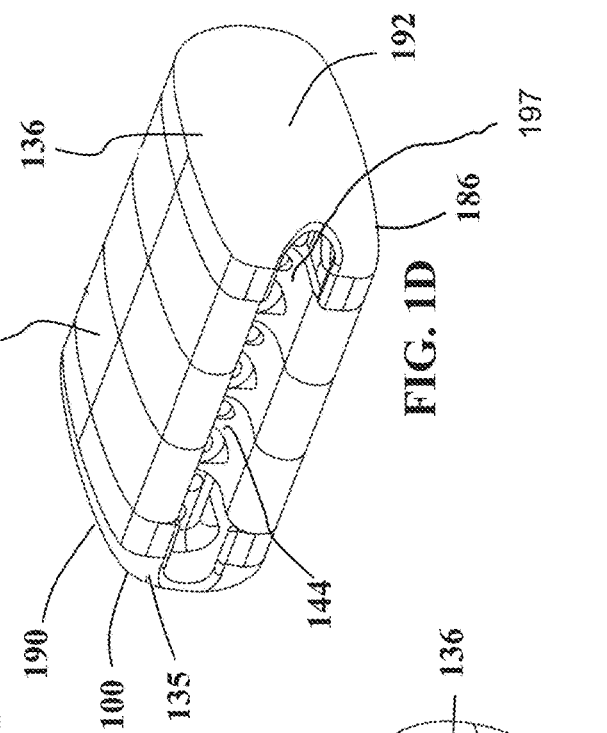
FIG. 1A depicts a top view of a nucleus polposus in an annulus fibrosus on a vertebral body.
Figure 1B:
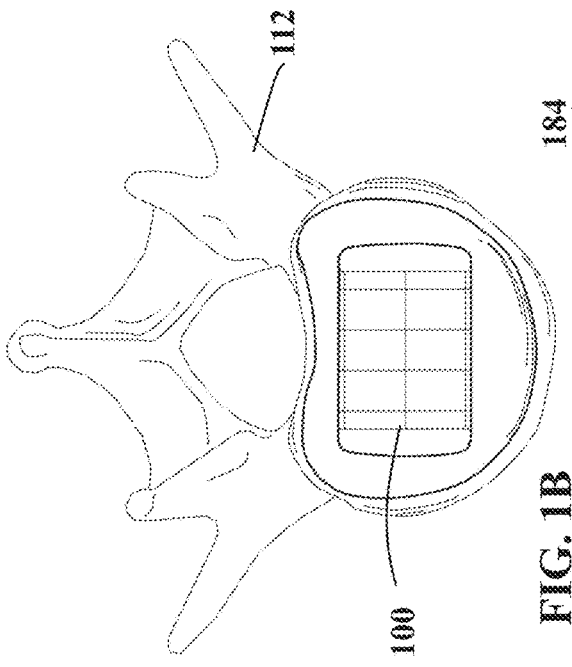
FIG. 1B depicts the vertebral body of FIG. 1A with the nucleus polposus replaced by a disc replacement implant of assembled modular disc implant segments.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

Referring to FIGS. 1A to 1D, systems, apparatuses and methods are disclosed for providing an implantable prosthesis 100 for repairing damaged intervertebral discs 110, such as a herniation 119, between vertebral bones 112, the discs comprising a nucleus pulposus 118 in an annulus fibrosus 120. The prosthesis, rather than be inserted as a unitary component, is configured as an assemblage 130 of modular disk implant segments 132 capable of being assembled in the cavity defined by the annulus fibrosus after the damaged nucleus pulposus 118 is removed. Embodiments include modular end disc implant segments 135, 136, and intermediate disc implant segments 138 that are constructed to include one or more portions 140 that are configured to have a greater compressibility than if the structure was solid of the same material, thereby facilitating compression/deflection of the encompassing structure into the one or more internal portions of greater compressibility.

Figure 1C:
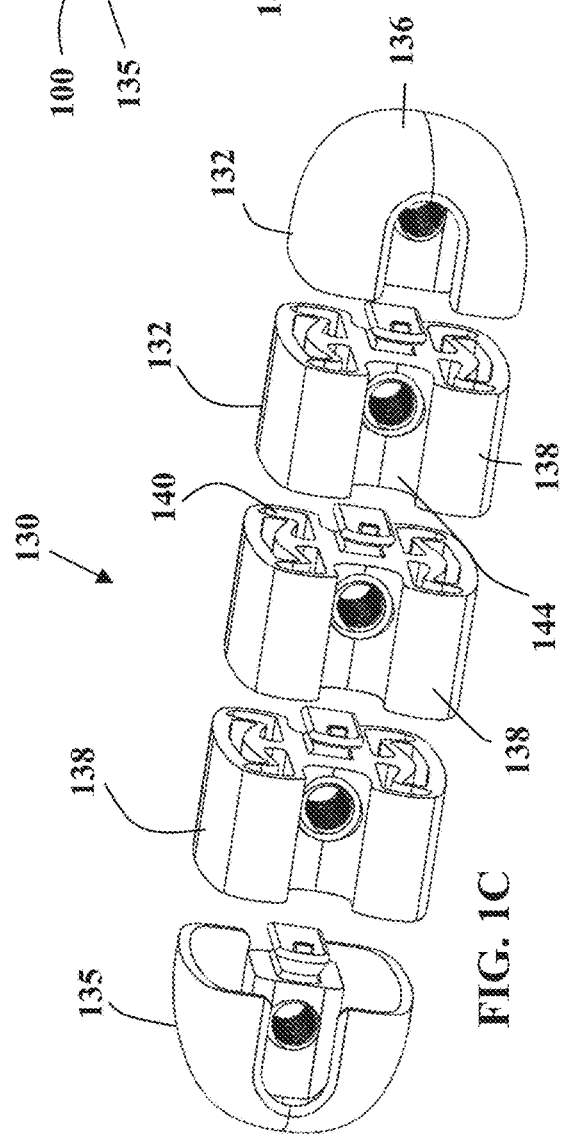
FIG. 1C depicts an assemblage of modular disc implant segments.
Figure 2A:
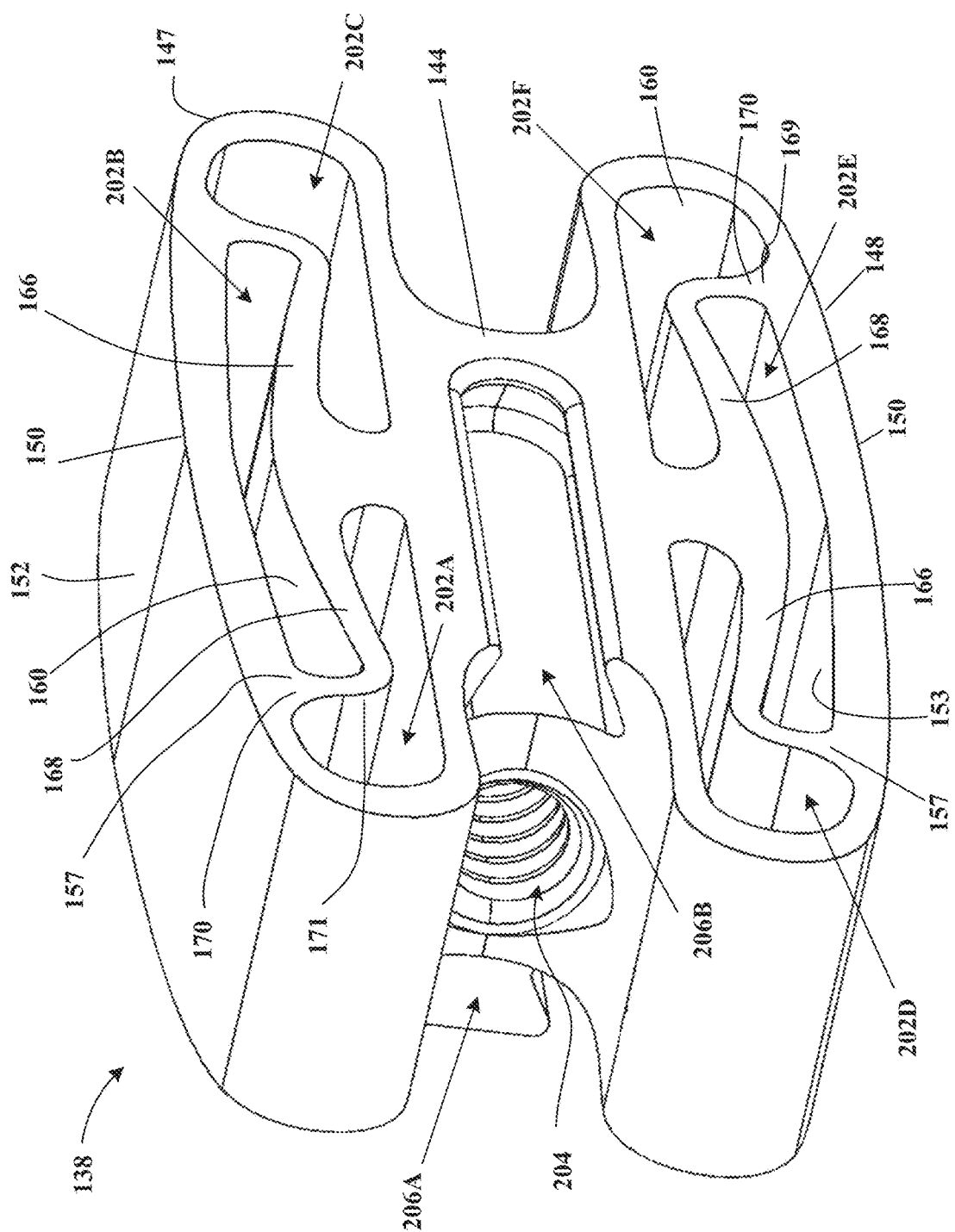
FIG. 2A depicts a representative embodiment of an intermediate modular disc implant segment that can form part of an intervertebral disc prosthesis that includes a plurality of modular disc implant segments.

Referring to FIGS. 1C and 2A, in embodiments, intermediate disk implant segment 138 has a central base portion 144 and a pair of compressible spring lobes 147, 148 unitary therewith and extending therefrom. Each spring lobe 147, 148 having an exterior wall portion 150 with an exteriorly facing surface 152 and an interiorly facing wall surface 153. The exterior wall portion connects to the central base portion 144 at junctures 157, defining an open interior 160. The exterior wall portion 150 extends outwardly from the central base portion 144 and loops around to the opposite side of the central base portion 144 having a C-shape or U-shape and defining the open interior 160. Internal spring members configured as spring arms 166, 168, extend through the open interior and are connected to the exterior wall portion 150 at junctures 169 that function as a living hinge 170; in that during compression, there may be some rotation of the arm portion 171 adjacent the living hinge 170 about the juncture. The spring arms 166, 168 may provide resistance to compression of the spring lobe by bending, extending, and/or contracting under resistance as the spring lobe is compressed and resiliently rebounds.

Figure 1D:
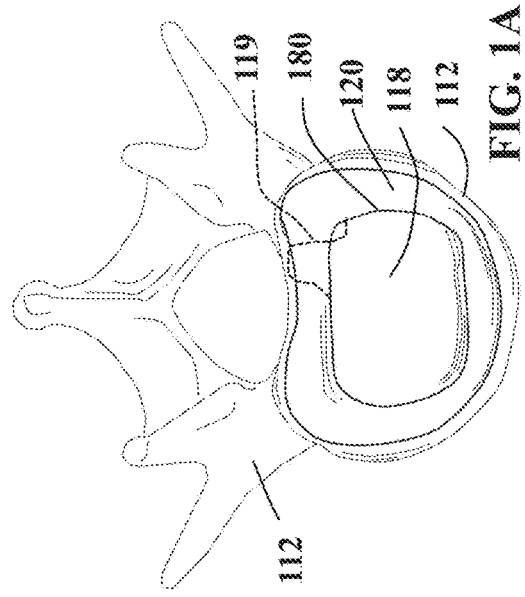
FIG. 1D depicts the assemblage of FIG. 1C assembled.

The assemblage 130 of modular disc implant segments can be sequentially inserted into a disc space 180 defined by the annulus fibrosus 120 and connected to one another, as further described below, to form a unitary structure, the prosthesis 100, capable of serving as a replacement nucleus pulposus in a damaged intervertebral disc. Referring to FIG. 1D, the prosthesis has a smooth convex upwardly facing surface 184, a smooth convex downwardly facing surface 186, smooth convex sideward facing surfaces 190, 192, and a forward facing surface 194 and a rearward facing surface 195, each with an elongate central recess 197 extending from one end disk implant segment 135 to an opposite end disk segment 136. The elongate recess at the central base portion 144 of the disk implant segments 132. In embodiments, the forward facing surface 194 and a rearward facing surface 195 may be convex with a plurality of openings associated with insertion tools and/or segment connection features.

Embodiments of the medical apparatus include a vertebral disc nucleus replacement apparatus comprising compressible disc implant segments formed of substantially non-elastomeric material, where an exterior wall portion and spring members facilitate compressibility of the component formed of substantially non-elastomeric material when arranged within the vertebral disc as a replacement to an original nucleus pulposus. For example, some embodiments involve a leaf spring-type structure, where the structure is compressible due to flexing of the leaf spring(s) relative to another part(s) of the disc implant segment.

In one embodiment, a connectable or interlockable modular disc nucleus implant system and apparatus is provided, where the connectable/interlockable modular implants are made from a rigid material (for example a Young's Modulus greater than 3.0 GPa) that is configured to have compressibility and can withstand rigorous manipulation in the body. One such material is polyether ether ketone, or "PEEK." PEEK materials used in embodiments herein may exhibit high temperature and chemical resistances, mechanical strength, resistance to abrasion, and biocompatibility. Such materials may also exhibit a compression modulus similar to that of human bone.

In embodiments, the present invention utilizes polyetheretherketone (PEEK), specifically Victrex PEEK 450G, as the material for a spinal disc nucleus replacement implant. PEEK is a high-performance, semi-crystalline thermoplastic that exhibits exceptional stiffness, mechanical strength, and resistance to deformation under physiological loading conditions. The superior performance of PEEK is supported by experimental data comparing it to polymeric materials under increasing load conditions.

The superior performance of PEEK in resisting displacement under load can be attributed to its high mechanical strength and stiffness: Tensile Strength: 98 MPa at 23° C. (ISO 527); Flexural Strength: 165 MPa at yield, 23° C. (ISO 178); Tensile Modulus: 4.0 GPa at 23° C., demonstrating high resistance to deformation; Young's Modulus (Flexural Modulus): 3.8 GPa at 23° C., providing rigidity necessary for spinal load-bearing applications.

Additionally, PEEK exhibits excellent thermal stability with a melting point of 343° C. and low water absorption of 0.45% at 23° C., ensuring dimensional stability and consistent mechanical performance in a physiological environment.

In embodiments, other materials may be used that have performance properties above that are within 30% plus or minus of the specific values above.

When a plurality of such adjacently positioned modular disc implant segments 132 are connected to form a unitary compressible structure 100, it serves as a motion-preserving device to replace an extracted, impaired nucleus pulposus. In some embodiments, one or more end modular disc implant segments 136 may have the same, or different, internal configuration as the intermediary modular disc implant segments 138. As represented by FIG. 1, there may be any total number of modular disc implant segments utilized (with or without end segments). In some embodiments, the plurality of modular disc implant segments 132 may be as low as two and up to as many as can be reasonably inserted and connected within the given disc space, although sizing preferences may involve more practical implementations from about three to five total implant segments.

Embodiments include implementation of any number of configurations providing spring members and open interiors. The spring members and open interior regions can be symmetrically or asymmetrically (e.g., offset to one side) positioned within the modular disc implant segment, or alternatively may be configured into a symmetric or asymmetric geometric lobe shape. Spring members may be of various lengths, for example from 4 mm to 20 mm. Spring members may be of various lengths, for example from 6 mm to 15 mm. The spring members may be greater than 4 mm in length embodiments. The spring members may be greater than 8 mm in length in embodiments. The spring members may be greater than 15 mm in length in embodiments. The spring members may have a first thickness of 2 to 2.0 mm displaced from the ends. In embodiments, the spring member may have a second thickness measured transverse to the first thickness of from 0.2 to 2.0 mm displaced from the ends. The spring members may have a first thickness of 4 to 3.0 mm displaced from the ends. In embodiments, the spring member may have a second thickness measured transverse to the first thickness of from 0.4 to 3.0 mm displaced from the ends.

Alternative embodiments to a structural void(s) (e.g., an open space(s)) include using a first material (e.g., PEEK) proximate one or more adjacent portions of greater compressibility, so that the first material can be compressed into, bend into, or otherwise be flexed into the receiving area(s) having a higher coefficient of compressibility. For example, in some embodiments the open regions may contain a material or substance(s) having a greater compressibility than the material from which the implant segments are otherwise constructed. That is, having a lesser Young's Modulus.

Thus, the overall compressibility is impacted by at least the material used in the portions having greater compressibility, which could be a pure void (e.g., air), fluid, gel, foam, and/or other material being more compressible than the first material (e.g., PEEK). The first material can be substantially incompressible (or at least inconsequentially compressible), or may itself have some level of compressibility. In some embodiments the first material and/or the second greater compressibility material may respectively be made from a homogeneous material, or alternatively one or both may be made from a heterogeneous material.

The modular disc implant segments may be constructed in known manners, including but not limited to extrusion, molding (e.g., injection molding, compression molding, blow molding, etc.) 3-dimensional (3D) printing, casting, machining, and the like.

The structure of exemplary modular disc implant segments therefore provides struts, arms, support tiers, trusses, "leaf spring" designs, and/or other design that incorporates structural support where necessary while facilitating compression in targeted areas of the modular disc implant segments.

While the embodiment of FIG. 2A can be constructed from polymers, metals, and/or other biocompatible material, the embodiment of FIG. 2A is described in terms of using PEEK. PEEK has a compression modulus analogous to human bone, so provides a somewhat natural structure for building a nucleus pulposus prosthetic. PEEK also exhibits characteristics that facilitate smooth or otherwise relatively unhindered movement or sliding between adjacent modular disc implant segments as they are successively implanted into the target disc space.

PEEK also exhibits a very robust longevity, thereby enabling long term benefit from the intervertebral disc prosthesis. The principles described herein are also equally applicable to other materials and compounds exhibiting some or all of these characteristics, such as metal, other polymers, etc. For example, one embodiment utilizes a titanium alloy for the body of the modular disc implant segments.

FIG. 2A depicts a representative embodiment of a modular disc implant segment 200 that can form part of a intervertebral disc prosthesis that includes a plurality of such modular disc implant segments 200. The representative embodiment of FIG. 2A includes a plurality of structural voids having some symmetry therein, including compression-absorbing spaces 202A, 202B, 202C, 202D, 202E, and 202F. These spaces or voids are strategically positioned, shaped, contoured, and otherwise arranged to properly equilibrate the absorption of, and resistance to, compression that will eventually be provided by a human recipient's spinal movement.

The representative modular disc implant segment 200 further includes an insertion-facilitating mechanism or portion 204 to assist in the insertion of the implant segment 200 into the target disc space. In the illustrated embodiment, the insertion-facilitating mechanism 204 comprises a female-threaded hole to receive a threaded instrument that can be used to guide, and in some embodiments lock, the modular disc implant segments into the target disc space. It should be recognized that the modular disc implant segments may be equipped with any connection mechanism to facilitate its surgical positioning in the intervertebral disc within the annulus fibrosus.

The representative modular disc implant segment 138 of FIG. 2A also includes a connection mechanism 206, which in the present example comprises slip fit components including male connector 206A and female connector 206B. In this manner, a tool coupled to the modular disc implant segment 138 via the female-threaded hole 204 can facilitate the coupling of the male connector 206A onto the female connector 206B of an adjacently positioned modular disc implant segment to connect two neighboring implant segments 200.

The male and female connectors 206A, 206B also facilitate proper alignment of the adjoining implant segments while connecting. In some embodiments, the "connection" is an interface or mating of physical elements, where in other embodiments the connection is made stronger in that it serves as an interlocked coupling. In some embodiments, the interface, mating, or interlocking mechanisms may be provided by intersecting physical components (e.g., tongue and groove, dovetail), interlocking physical components (e.g., a slip fit), etc. In one interlocking embodiment, the mating physical components are configured to create an interference fit to provide a retention force and thereby prevent unintended separation of the adjoining parts.

In still other embodiments, magnetics can be used to mate neighboring modular disc implant segments. For example, some or all of the top half of a modular disc implant segment 200 could include magnetic material that is magnetized with a first polarity (e.g., north), and some or all of the bottom half of the implant segment 200 could include magnetic material that is magnetized with a second polarity (e.g., south) to facilitate a magnetic snap fit (with or without additional physical mating or connecting items) between the two neighboring modular disc implant segments. In such an embodiment, magnetic material in the modular disc implant segment can also serve as a radiopaque marker for visualization during the surgical procedure.

Figure 2B:
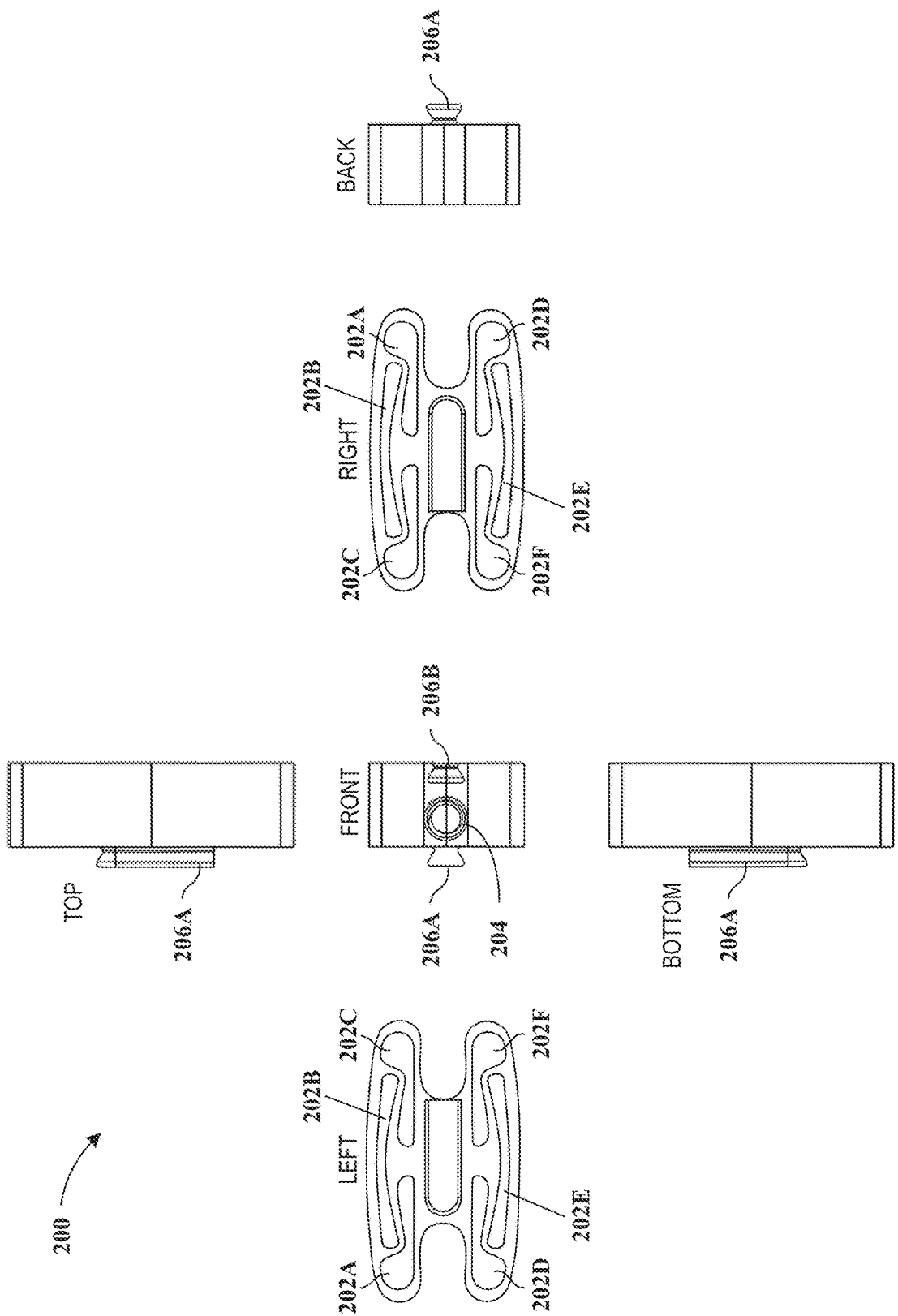
FIG. 2B depicts the faces of the representative isometric modular disc implant segment.

FIG. 2B depicts the faces of the representative isometric modular disc implant segment 138 of FIG. 2A. The depicted faces include the left, front, right, back, top and bottom views, where reference numbers used in connection with FIG. 2A are reproduced in FIG. 2B.

Figure 2C:
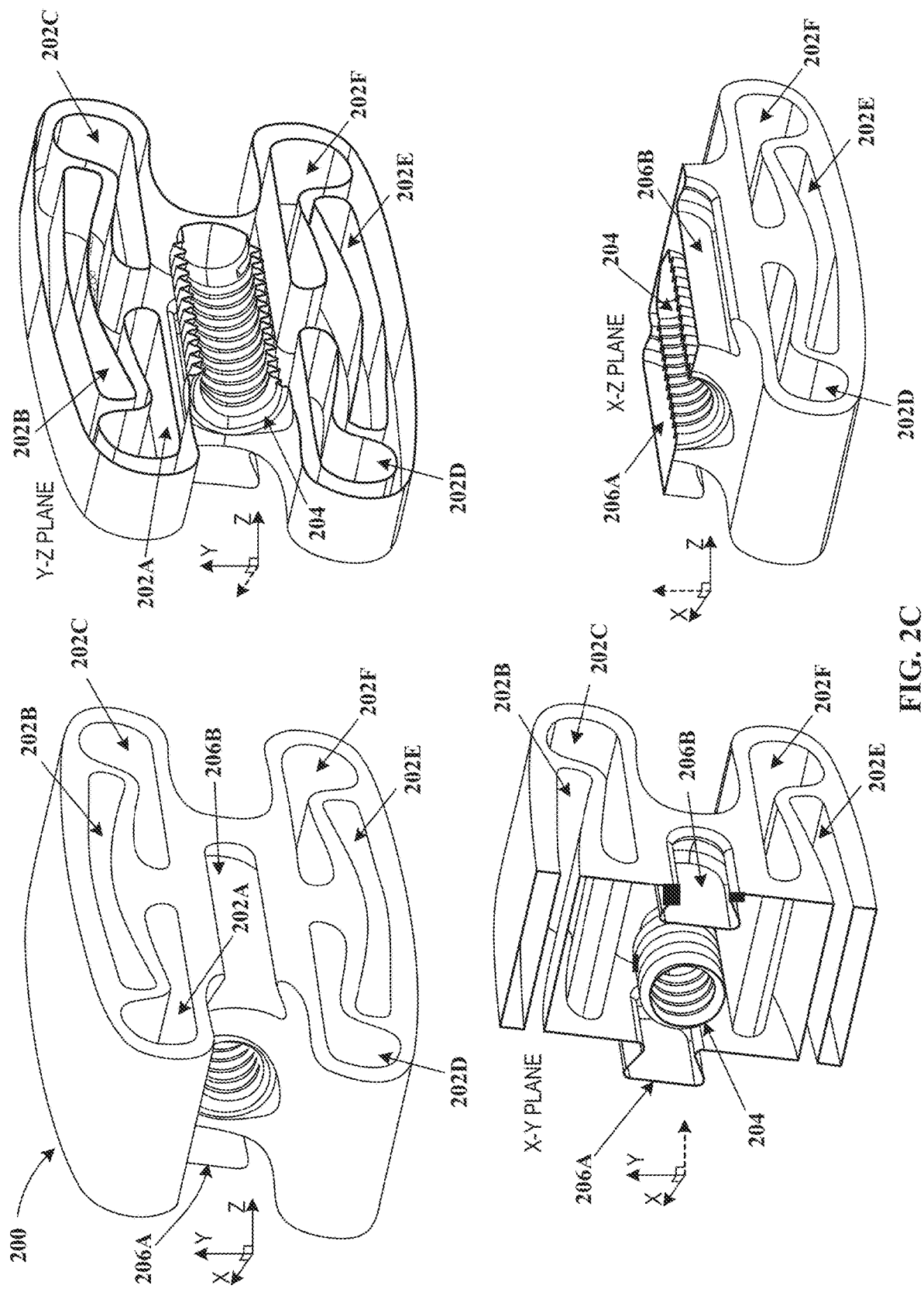
FIG. 2C depicts a number of cross-sectional views of the isometric modular disc implant segment 200.

FIG. 2C depicts a number of cross-sectional views of the isometric modular disc implant segment 200 of FIG. 2A. In the illustrated embodiment, the cross sections are depicted along the X-Y PLANE, the Y-Z PLANE, and the X-Z PLANEs.

Figure 2D:
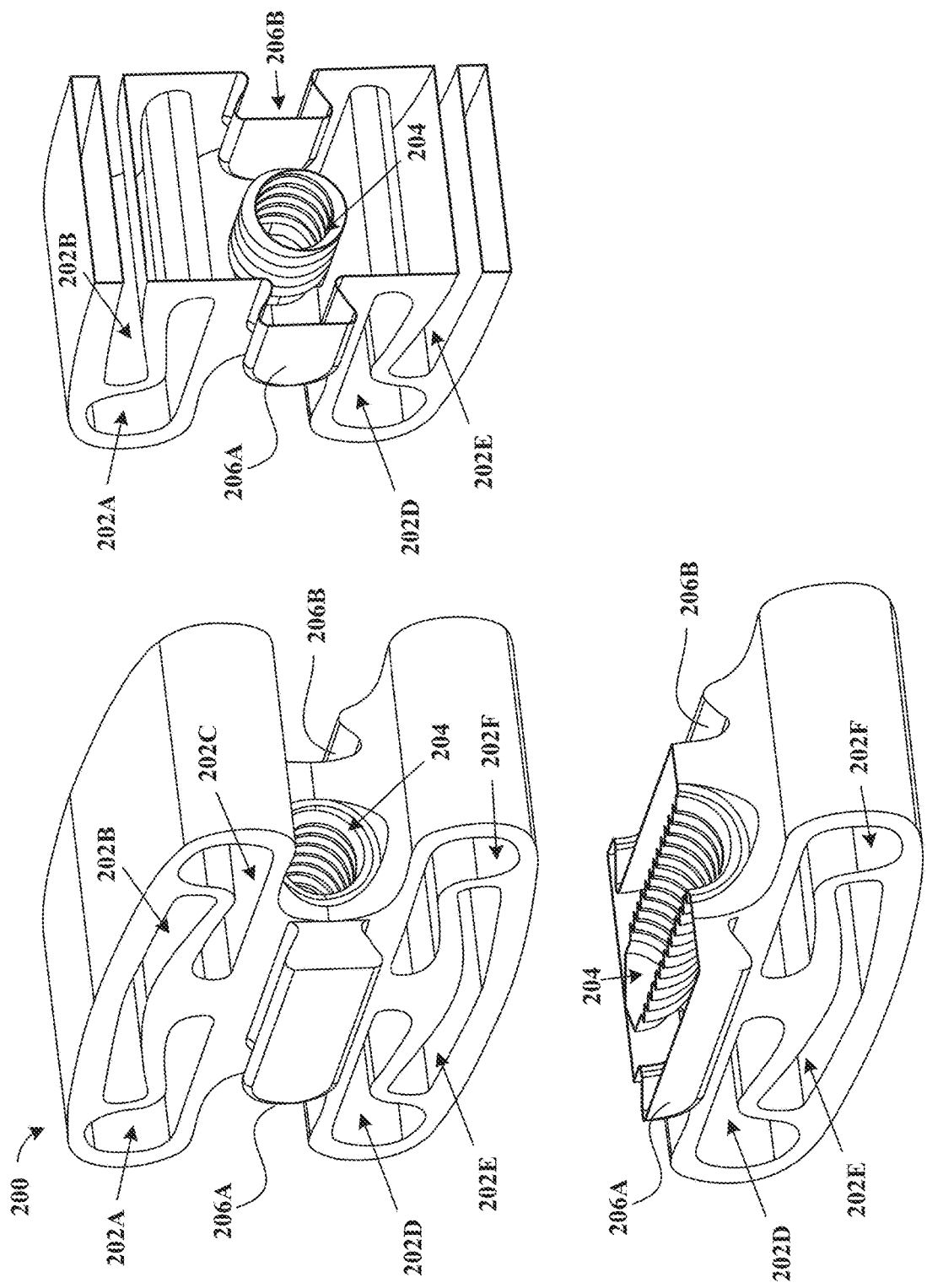
FIG. 2D depicts a number of cross-sectional views of the opposite side of the isometric modular disc implant segment 200.

FIG. 2D depicts a number of cross-sectional views of the opposite side of the isometric modular disc implant segment 200 of FIG. 2A. From this view, one embodiment of the mail connector 206A of the connection mechanism 206 is visible.

Figure 2E:
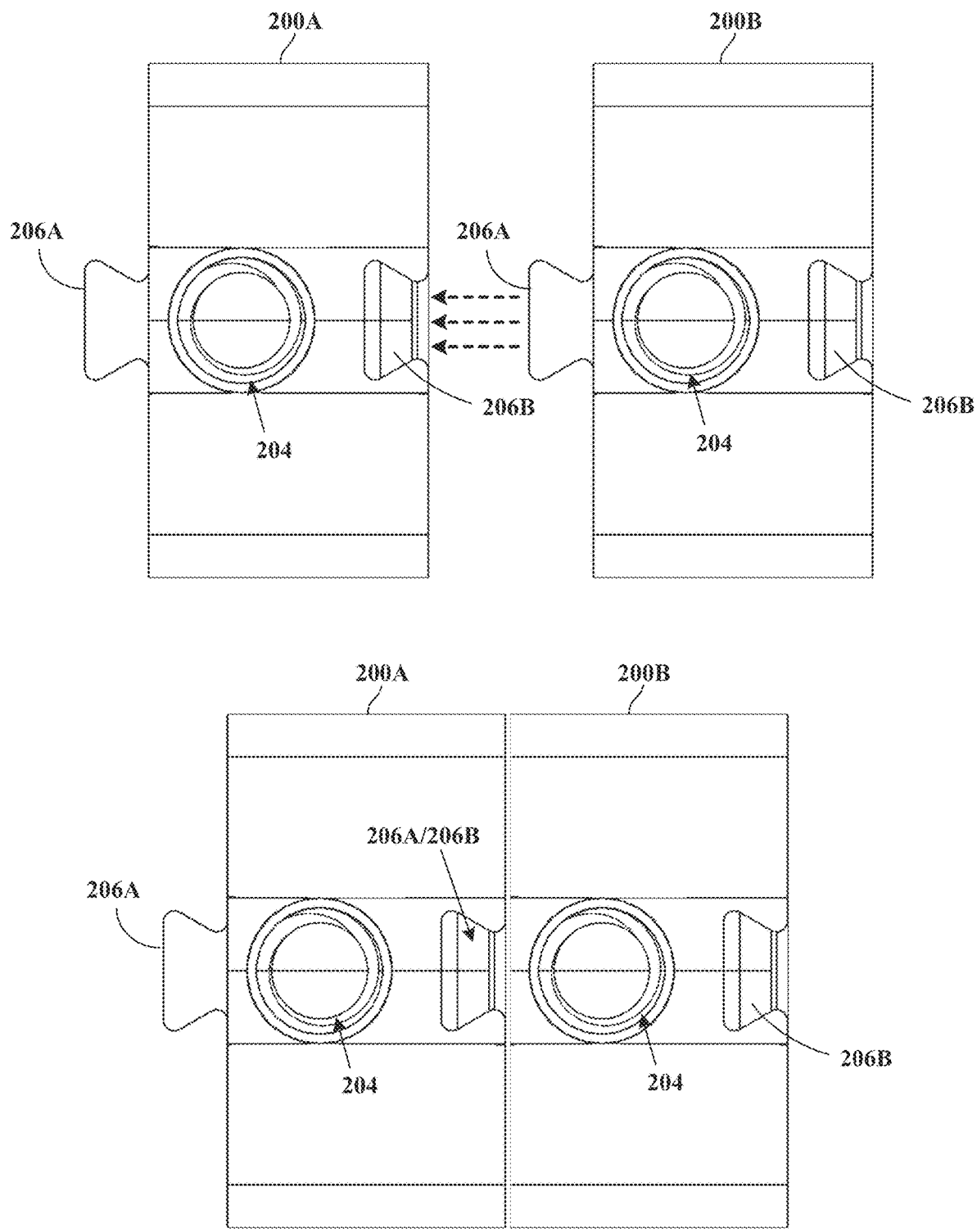
FIG. 2E depicts a representative manner of connecting two (or more) of the modular disc implant segments together.

FIG. 2E depicts a representative manner of connecting two (or more) of the modular disc implant segments 200A, 200B together. In one embodiment, these segments 200A, 200B are connected after the segment 200A has been inserted into the disc space created by evacuating the existing nucleus pulposus, and during insertion of the adjacent segment 200B into the disc space. In the illustrated embodiment, an insertion part 206A of a first modular disc implant segment 200A is slid over and along a groove 206B of the adjacent modular disc implant segment 200B, such as in a slip fit configuration. In one embodiment, the shape of the male connector 206A within the female connector 206B holds the two modular disc implant segments 200A, 200B together. In other embodiments, a friction or interference fit may instead, or additionally, be implemented to maintain the two modular disc implant segments 200A, 200B in their desired relative positions.

FIG. 2F is an example of a constructed intervertebral disc nucleus prosthesis 210 formed by a plurality of connected modular disc implant segments 200. In this embodiment, there are five modular disc implant segments, including 3 internal modular disc implant segments 200, and first and second termination modular disc implant segments 201A, 201B. In one embodiment, the termination modular disc implant segments 201A, 201B differ in structural arrangement from the internal modular disc implant segments 200, as they have only one open side in the illustrated embodiment. The cross-sectional view 211 of the representative intervertebral disc nucleus prosthesis 210 reveals the internal portions of the aggregation of modular disc implant segments, including the insertion-facilitating mechanism male connector 206A and female connector 206B of the connection mechanism 206. As previously noted, the male connector 206A and female connector 206B of the connection mechanism 206 hold the modular disc implant segments together to form a unitary intervertebral disc nucleus prosthesis 210, thereby serving as a motion-preserving device.

In one embodiment, the intervertebral disc nucleus prosthesis 210 is sized, relative to the receiving target disc space of the extracted nucleus pulposus, to eliminate or limit migration. For example, in one embodiment, the intervertebral disc nucleus prosthesis 210 is sized to as large or larger (at least in some dimensions) than the target disc space. In other embodiments, the size of the intervertebral disc nucleus prosthesis 210 may be smaller than the target disc space, but preferably held substantially in place with minimal ability to internally migrate.

FIG. 2G depicts some of the faces of the representative intervertebral disc nucleus prosthesis 210 of FIG. 2F. FIG. 2G depicts an isometric view, a side view of each termination modular disc implant segments 201A, 201B, a top view, a front view, and a back view. The representative intervertebral disc nucleus prosthesis 210 of FIG. 2G. When external pressure is exerted on such an intervertebral disc nucleus prosthesis 210 (e.g., from lateral, anterior and/or posterior movement of the prosthesis-receiving patient), the pressure-experiencing portion(s) of the intervertebral disc nucleus prosthesis 210 will deflect inward to absorb and respond to the exerted pressure.

Figure 2H:
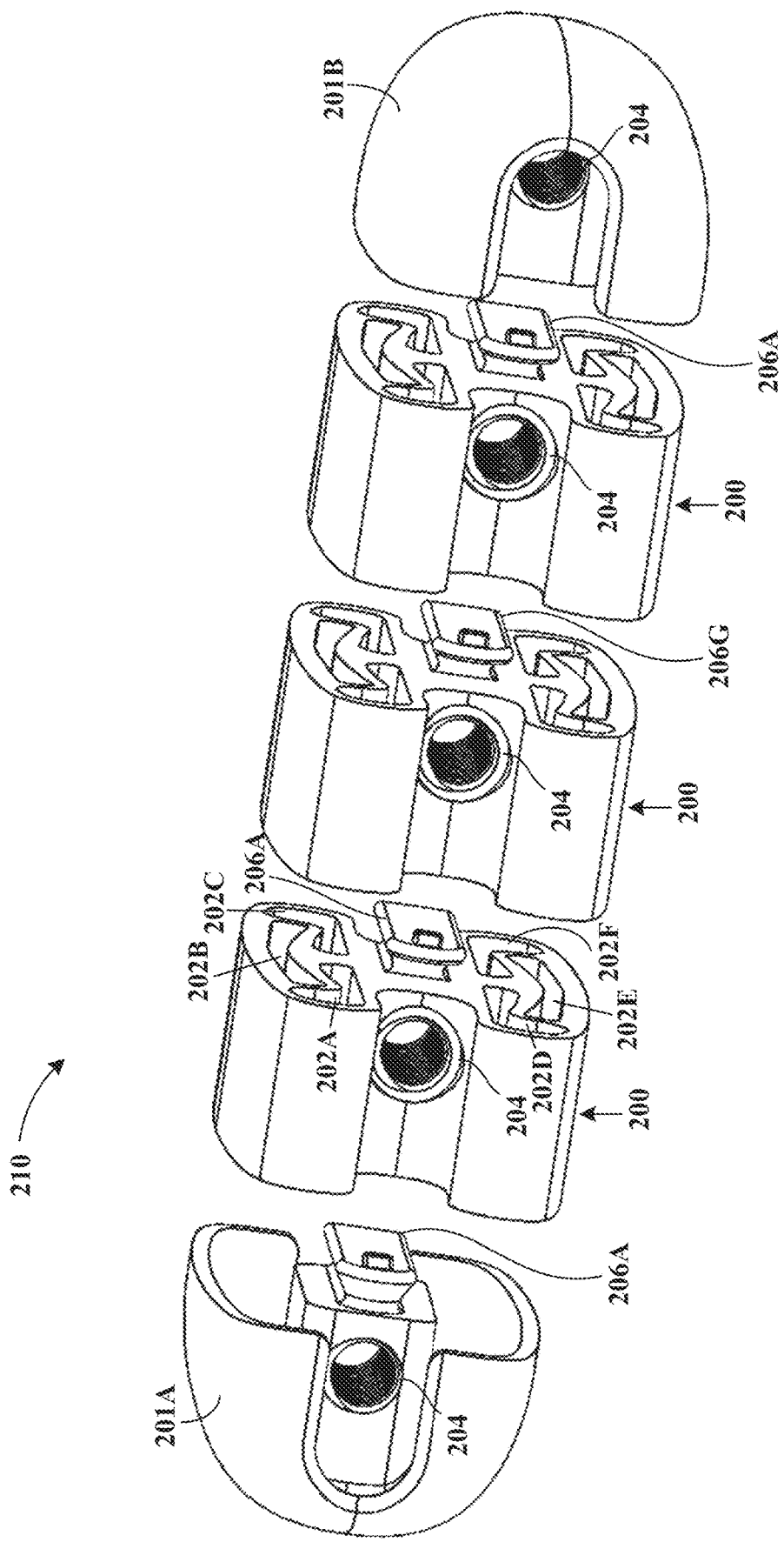
FIG. 2H depicts an exploded view of the termination and internal modular disc implant segments of a representative five-component intervertebral disc nucleus prosthesis.
Figure 21:
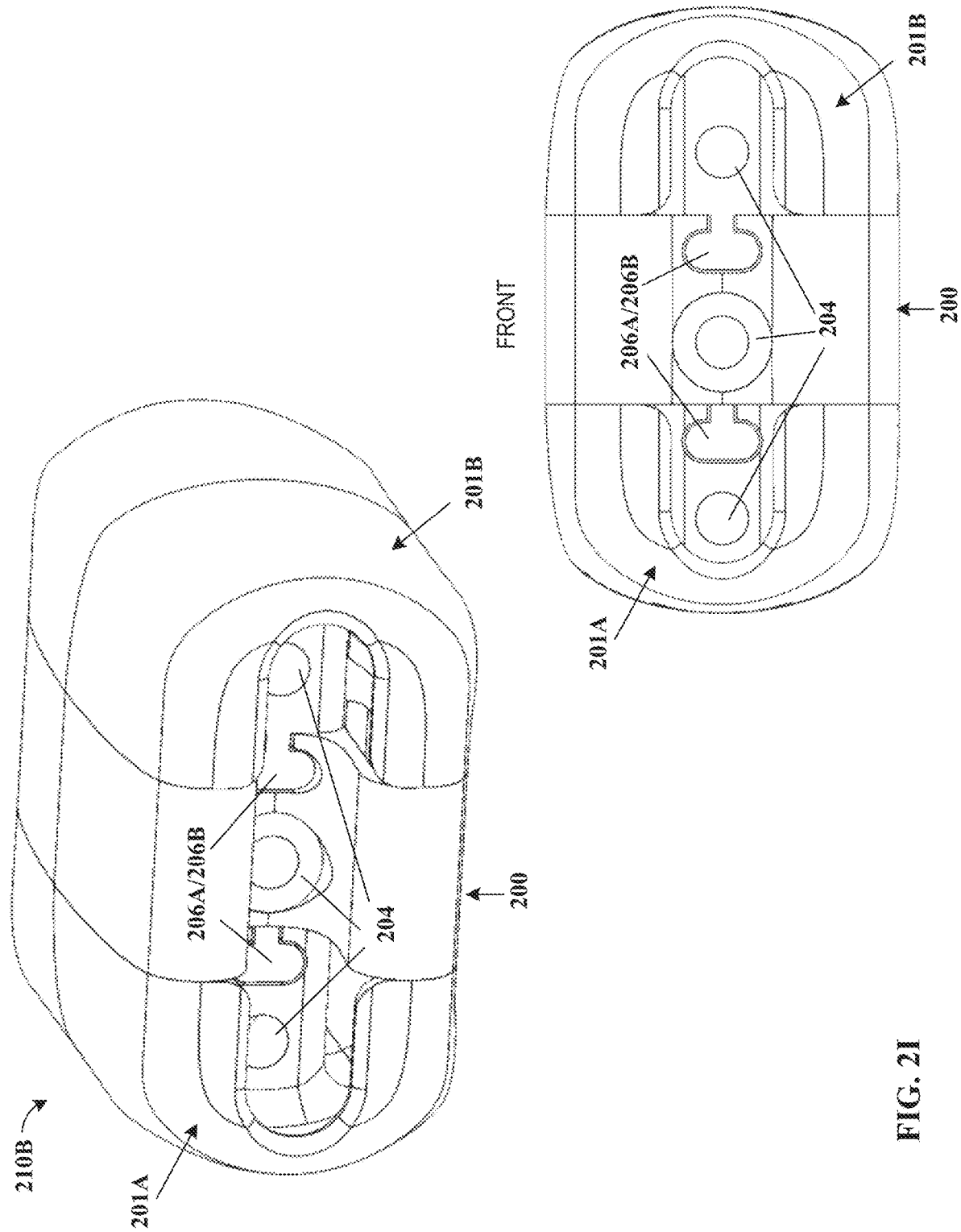

FIG. 2H depicts an exploded view of the modular disc implant segments 200, 201A, 201B of a five-component intervertebral disc nucleus prosthesis 210. Among other things, this depiction indicates a representative manner to connect the modular disc implant segments, such as by way of the male connector 206A of the connection mechanism 206 (receiving/female connector 206B not visible in FIG. 2H). In one embodiment, the mail connector 206A is slid over a receiving groove (not shown) on an adjacent modular disc implant segment. In one particular embodiment, the abutting modular disc implant segments can then be locked together using, for example, a set screw in the insertion facilitating portion 204 may bolster the connection therebetween, where in other embodiments such set screw or other additional connection means is not used in addition to the physical mating of the connection elements.

FIG. 2I depicts another embodiment of a constructed intervertebral disc nucleus prosthesis 210B formed by a plurality of connected modular disc implant segments 200. In the illustrated embodiment, the intervertebral disc nucleus prosthesis 210B includes fewer modular disc implant segments than the example of FIGS. 2F and 2G. This illustrates that the intervertebral disc nucleus prostheses described herein may be of any number of sizes, with any number of disc implant segments (including or exclusive of termination modular disc implant segments), where in this illustrated embodiment the total number of modular disc implant segments is three. Particularly, this illustrative intervertebral disc nucleus prosthesis 210B includes one modular disc implant segments 200, and two termination modular disc implant segments 201A, 201B.

Figure 2J:
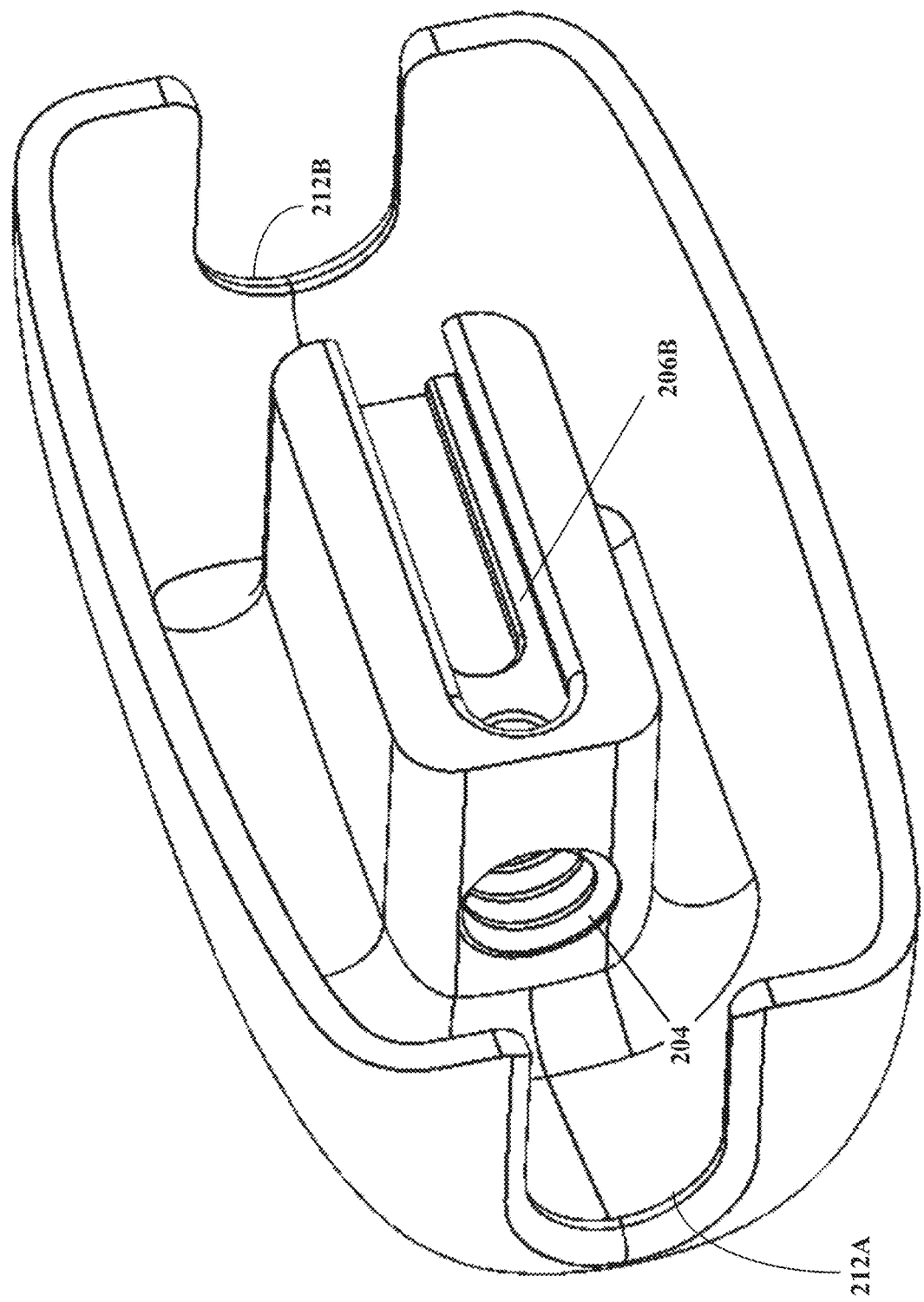
FIG. 2J depicts a representative termination modular disc implant segment that may be used as an endcap of the intervertebral disc nucleus prosthesis.

FIG. 2J depicts a representative termination modular disc implant segment 201A. In this embodiment, the insertion-facilitating mechanism 204 (e.g., female-threaded hole) can be accessed through an access space 212A in the termination modular disc implant segment 201A. In the illustration, the female connector 206B of the connection mechanism 206 is visible, and in a state where it can receive a mail connector 206A from an adjacently placed modular disc implant segment in order to interconnect the segments. Additionally, pivot hinges 212A and 212B may further facilitate deflection, in addition to the structure of the termination modular disc implant segment 201A into the structural void created thereby.

The examples of FIGS. 2A-2J depict a representative modular connectable segment that can be assembled in situ with one or more other such modular connectable segments to ultimately provide an implanted intervertebral disc prosthesis, where the modular connectable segment may be constructed from a generally non-elastic material that is compressible into one or more integrated spaces or voids. For example, in one embodiment, a modular disc implant segment is provided that includes one or more structural gaps, openings, slits, or other structural voids to facilitate compression of the implant segment in response to an external force, where the implant segment is configured to return towards its original geometric shape in response to diminution of the external force.

Figure 3A:
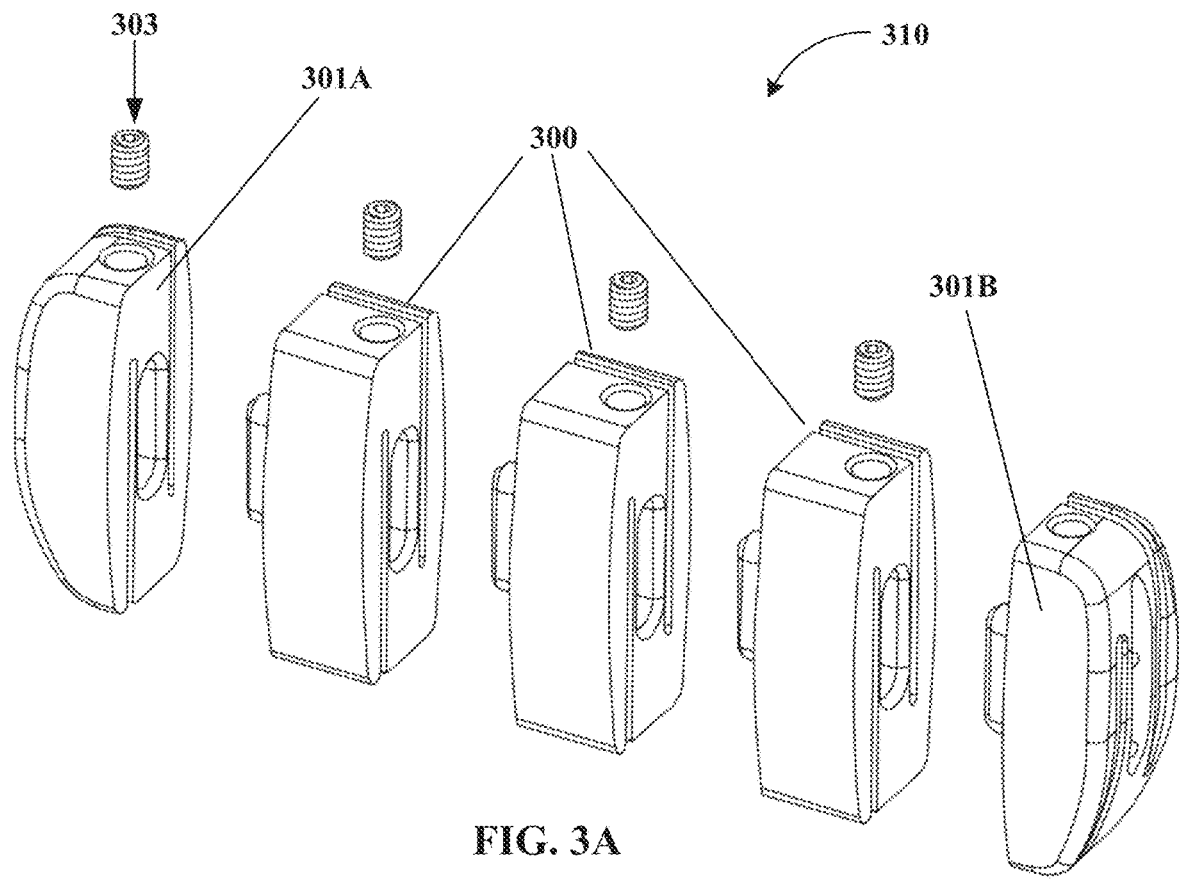
FIGS. 3A-3E depict another embodiment of an intervertebral disc nucleus prosthesis utilizing a leaf spring design in accordance with the principles of the disclosure.

FIG. 3A depicts another embodiment of an intervertebral disc nucleus prosthesis 310 in accordance with the principles of the disclosure. This embodiment includes first and second termination modular disc implant segments 301A, 301B, and 3 intermediary modular disc implant segments 300. Set screw 303 depicts a representative manner in which the modular disc implant segments can be locked together. When interconnected, the modular disc implant segments 300, 301A, 301B collectively form the intervertebral disc nucleus prosthesis 310 depicted in FIG. 3B.

Figure 3B:
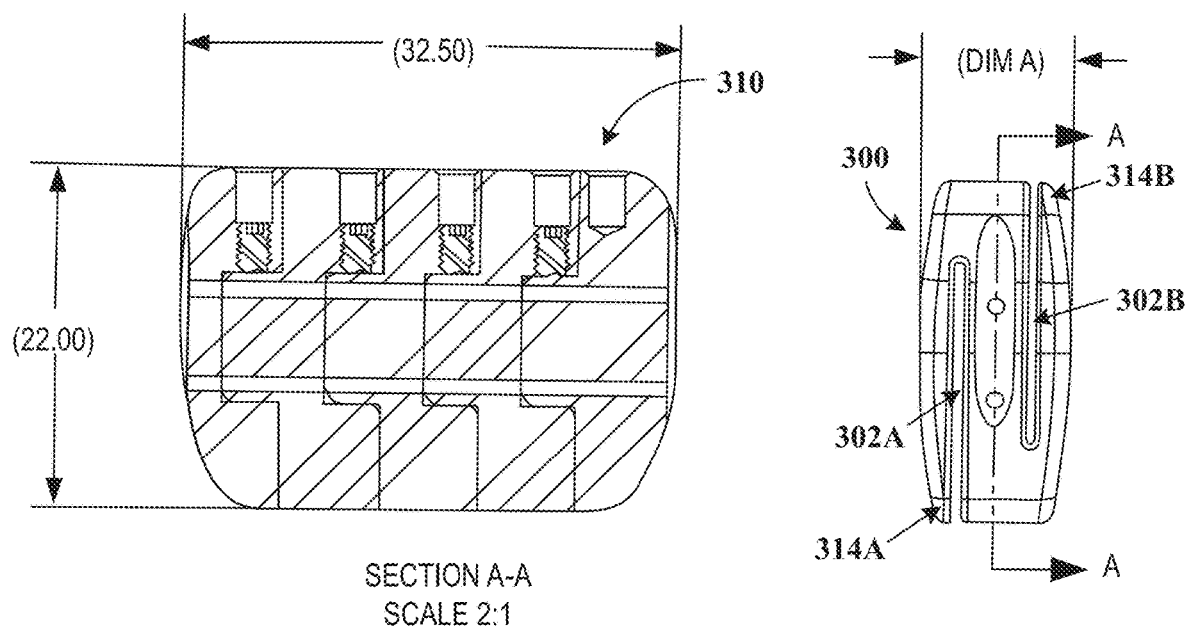
Figure 3C:
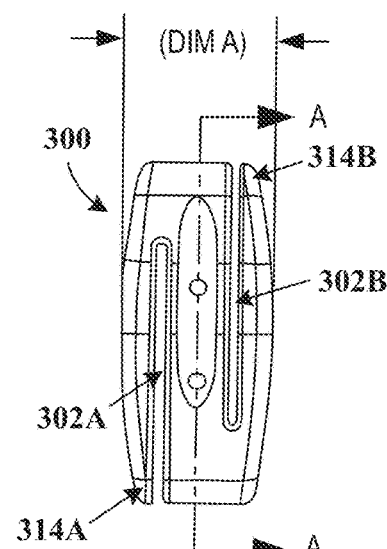

FIG. 3C depicts another representative configuration of structural voids in the modular disc implant segments. In this embodiment, the structural voids are represented by slits or open channels terminating at opposite ends of the modular disc implant segments 300. These structural voids enable bending/flexing of the arms 314A, 314B to facilitate the compression of the aggregate intervertebral disc nucleus prosthesis 310. As in other embodiments, this "leaf spring" arrangement properly equilibrates the absorption of, and resistance to, compression that will eventually be exerted due to a human recipient's spinal movement.

Figure 3D:
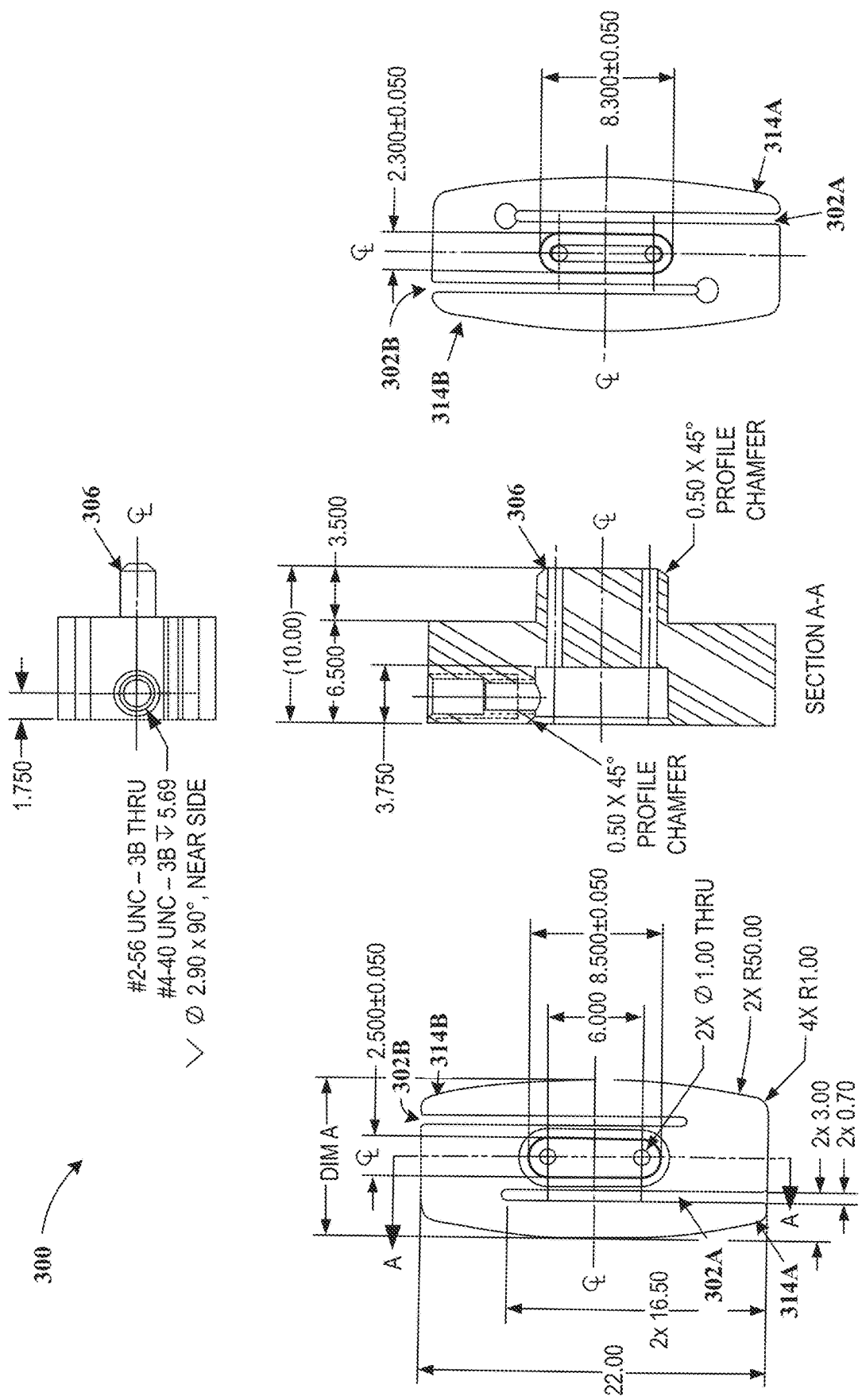
Figure 3E:
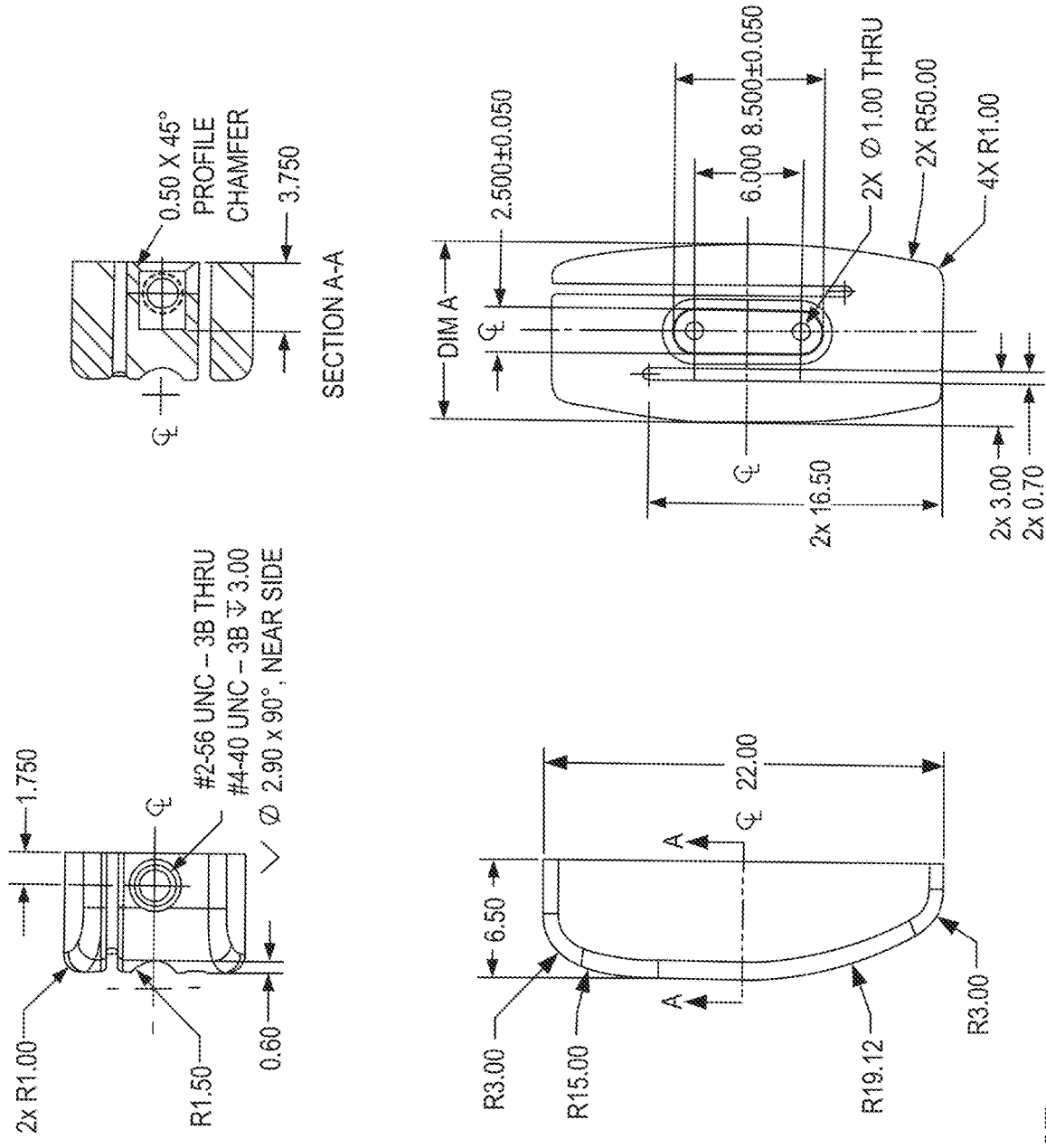

FIG. 3D depicts four faces of the representative modular disc implant segment 300 of FIGS. 3A-3C. FIG. 3D depicts locations of the gaps 302A, 302B (structural voids) between the arms 314A, 314B relative to the internal body of the modular disc implant segment 300 itself. FIG. 3D also displays a connection mechanism including a male connector 306 which can be used to align and connect to another, adjacent implant segment 300. Further, FIG. 3D depicts another embodiment of an insertion-facilitating mechanism 404 to assist in the insertion of the implant segment 300 into the target disc space. In the illustrated embodiment, the insertion-facilitating mechanism 304 comprises a female-threaded hole to receive a threaded instrument that can be used to guide, and in some embodiments lock, the modular disc implant segments into the target disc space. FIG. 3E depicts additional details on the embodiment described in connection with FIGS. 3A-3D. The exterior dimensions of FIGS. 3D and 3E are exemplary for the different segment embodiments. In embodiments, intermediate implant segments have particular ones of the exterior dimensions identified and that are deducible from the drawings, that are with 10% plus or minus those portrayed in FIGS. 3D and 3E. In embodiments, intermediate implant segments have particular ones of the exterior dimensions identified and that are deducible from the drawings, that are with 25% plus or minus those portrayed in FIGS. 3D and 3E.

Figure 4:
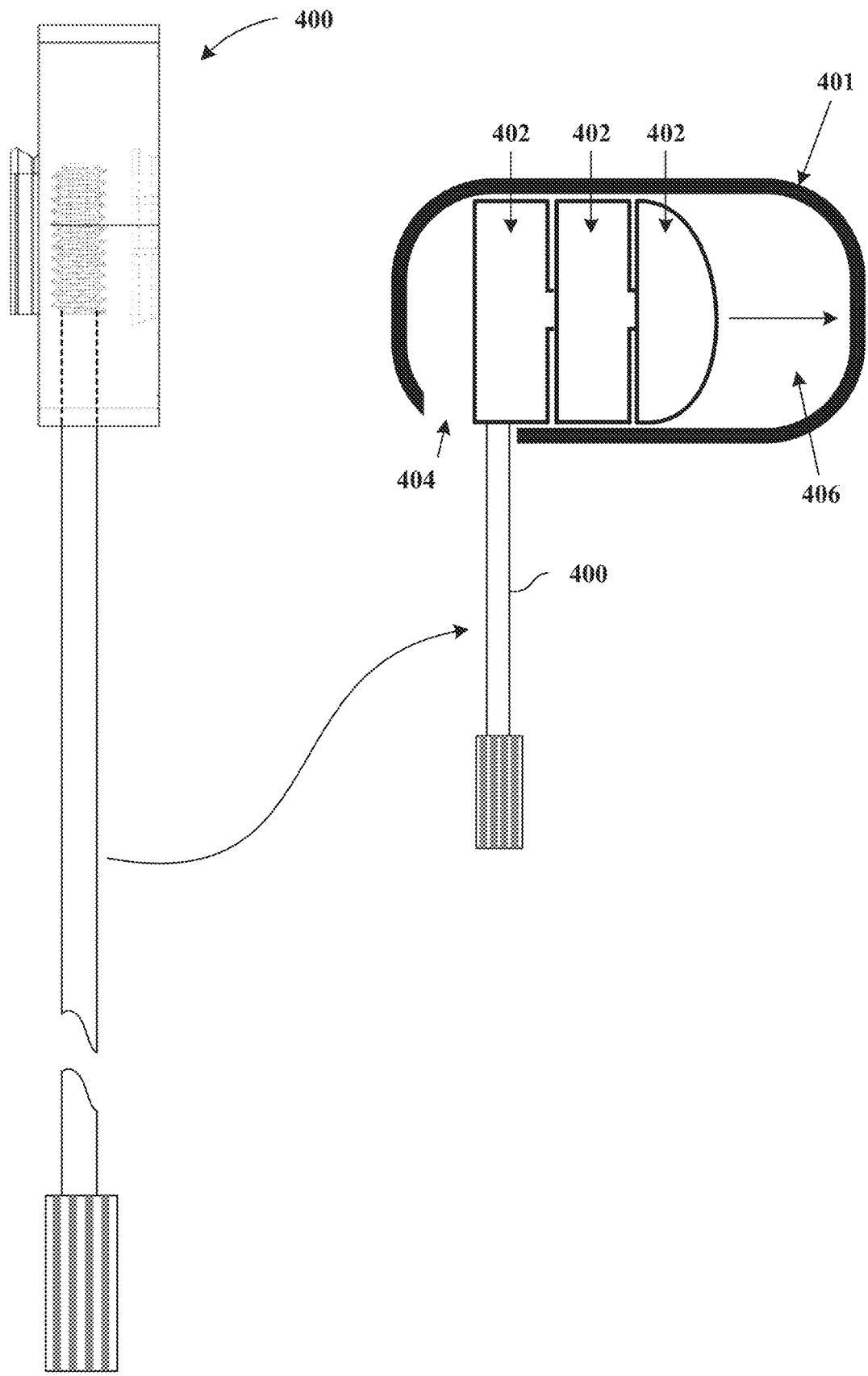
FIG. 4 depicts a representative manner in which the modular disc implant segments may be implanted into the annulus fibrosus.

FIG. 4 depicts a representative manner in which the modular disc implant segments may be implanted into the annulus fibrosus 401. The representative implant tool 400 can couple to the modular disc implant segments 402 to guide them through an access orifice 404 created in the annulus fibrosus 401 and facilitate interconnection and/or interlocking an adjacent modular disc implant segment. In such a manner, the target disc space 406 can be equipped with a unitary intervertebral disc nucleus prosthesis as described herein.

Figure 5:
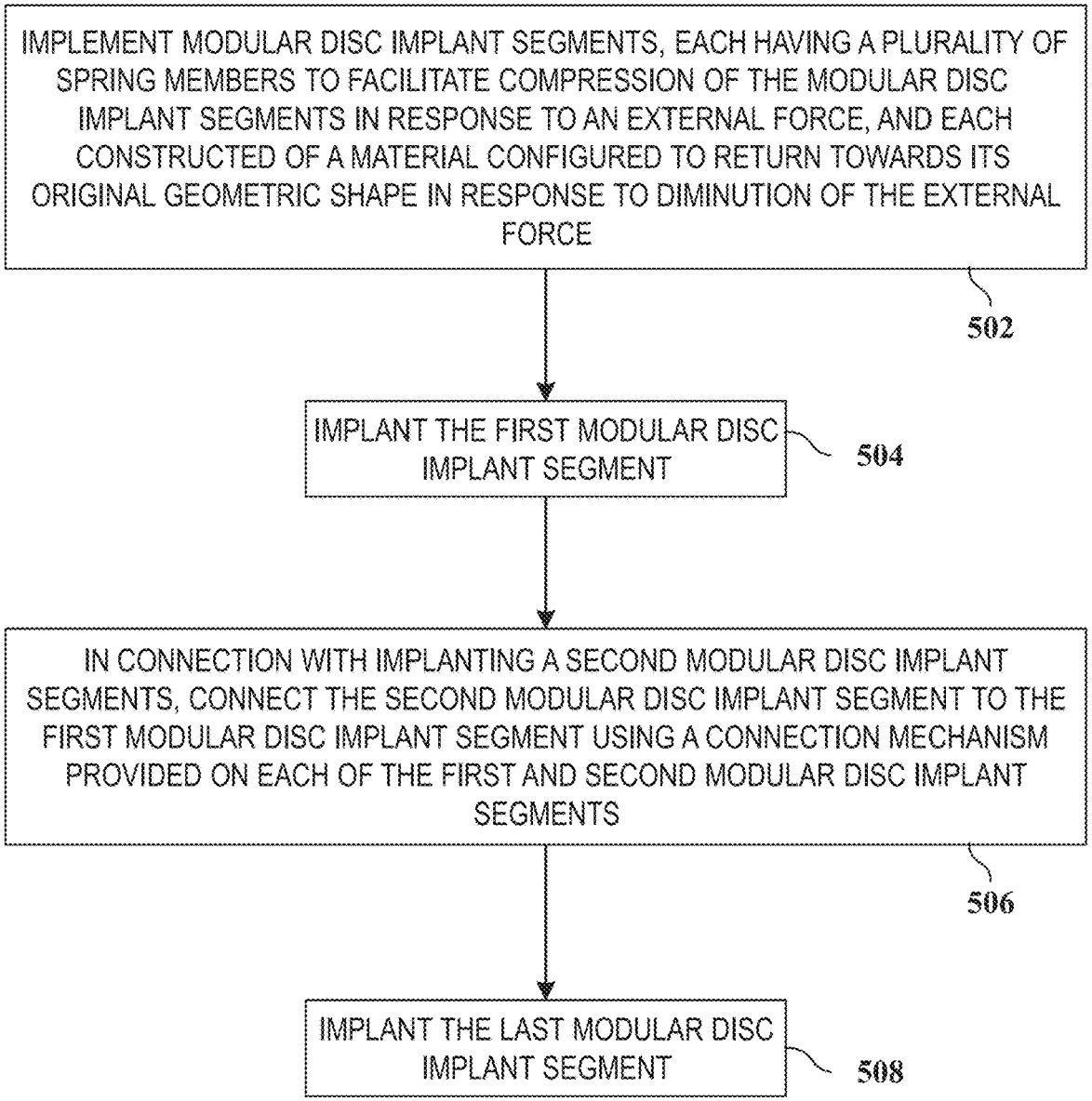
FIG. 5 depicts a representative process in which a surgeon can implement the teachings herein to implant a unitary intervertebral disc nucleus prosthesis.

FIG. 5 depicts a representative process in which a surgeon can implement the teachings herein to implant a unitary intervertebral disc nucleus prosthesis. In such an embodiment, the surgeon can utilize modular disc implant segments, each having structural voids to enable compression of the modular disc implant segments in response to an external force, and where each are constructed of a material configured to return towards its original geometric shape in response to diminution of the external force. The process includes implanting a first modular disc implant segments, and in connection with implanting a second modular disc implant segment, the surgeon can connect the second modular disc implant segment to the first modular disc implant using a connection mechanism provided on each of the first and second modular disc implant segments. The last of the modular disc implant segments is then implanted to form an aggregate intervertebral disc prosthesis in situ in the patient.

The present disclosure solves numerous problems of the prior art, including insertion and biomaterial problems. In one embodiment, a solution is provided by using a single well known, biocompatible, thermoplastic material with a unique design that takes advantage of this material's excellent flexion fatigue characteristic to provide a compression modulus for the motion segment similar to the native nucleus pulposus in all ranges of motion, while also having a compression modulus of the material similar to bone.

Such an embodiment will allow the surgeon to reestablish the normal disc height and re-tense the annulus fibrosus fibers to establish a physiologic load sharing between the annulus and the nucleus pulposus.

Embodiments set forth herein include a simple yet robust attachment system to make implantation for the modules fast, reproducible, easily learned and secure.

As noted herein, the inventive information includes the various representative embodiments disclosed herein, which those skilled in the art can appreciate other embodiments from the teachings provided herein. Other representative/exemplary embodiments are set forth herein.

In one representative embodiment, a disc nucleus replacement apparatus is provided that implements a leaf spring arrangement to provide the necessary compressibility to mimic the native nucleus pulposus to allow motion between adjacent vertebrae.

In another particular embodiment, such a disc nucleus replacement apparatus (also referred to herein as an "implant") includes a non-elastomeric material configured with one or more moveable leaves, (connected but separated from the body of the implant by an open channel) such that the implant as a whole is compressible. In a more specific representative embodiment, two or more leaf springs are configured in each module. In another more specific embodiment, the material comprises polyether ether ketone (PEEK), and in some embodiments the material is made entirely of PEEK.

In yet another embodiment of such a disc nucleus replacement apparatus, the material comprises a thermoplastic material, where in other embodiments the material comprises an elastomer, where in still other embodiments the material comprises a composite of elastomer and thermoplastic. In still other embodiments the material comprises a metal, where in yet other embodiments the material comprises a composite of metal and polymer (e.g., elastomeric or thermoplastic).

In another particular embodiment of such a disc nucleus replacement apparatus, the material has a hardness or compression modulus similar to bone.

In another particular embodiment, the implant includes two or more modules to allow insertion through a pathway in the annulus fibrosus. In a more specific embodiment, the modules include channels configured in a Z configuration with the open end on the upper channel facing posterior, and the open end of the lower channel facing anterior. In an alternative specific embodiment, the modules include channels configured in a Z configuration with the open end on the upper channel facing anterior, and the open end of the lower channel facing posterior. In yet other embodiments, the implant is inserted through a sequential dilator and distraction instrument(s), while in other embodiments the open anterior channel ends posteriorly in an enlarged, generally circular space to improve the compressibility of the leaf element. In another embodiment, the open posterior channel ends posteriorly in an enlarged, generally circular space to improve the compressibility of the leaf element.

In another embodiment, such a disc nucleus replacement apparatus is configured for insertion through Posterior Lumbar Interbody Fusion (PLIF), Transforaminal Lumbar Interbody Fusion (TLIF), and for lateral approaches.

Another embodiment includes a vertebral disc nucleus replacement apparatus comprising one or more structural voids within a substantially non-elastomeric component, where the structural voids facilitate compressibility of the substantially non-elastomeric component proximate the one or more structural voids when arranged within the vertebral disc as a replacement to an original nucleus pulposus.

The foregoing description of representative embodiments has been presented for the purposes of illustration and description. It is not intended to be exhaustive or to limit the disclosure to the precise forms disclosed. Many modifications and variations are possible in light of the above teaching without departing from the broader scope and spirit of the disclosure. Teachings in the specification and drawings are therefore regarded as illustrative, and not restrictive. The invention covers alternatives, modifications, and equivalents that come within the scope and spirit of the principles set out herein and/or in the appended claims.

The accompanying drawings forming a part of the disclosure show, by way of illustration and not of limitation, particular representative embodiments in which the disclosed concepts may be practiced. Therefore, this Detailed Description is not to be taken in a limiting sense, and the scope of various embodiments is defined only by the appended claims, along with the full range of equivalents to which such claims are entitled.

The embodiments of the innovative subject matter may be collectively or individually referred to herein as the "invention" for convenience, without intending to restrict the scope of this application to any single invention or inventive concept if multiple concepts are disclosed. Therefore, while specific embodiments have been illustrated and described herein, it should be understood that any arrangement designed to achieve the same purpose may be substituted for the specific embodiments shown. This disclosure intends to encompass all adaptations or variations of various embodiments. Those skilled in the art will recognize combinations of the above embodiments and other embodiments not explicitly described herein upon reviewing the foregoing description.

The following United States patents are hereby incorporated by reference herein for all purposes: U.S. Pat. Nos. 5,888,220; 7,713,301; 8,038,718; 8,100,977; 8,123,750; 9,510,953; 10,195,048; and 11,246,714. Published U.S. Patent Applications: US2004/0247641; US2006/0111726; and US2008/0071379 are hereby incorporated by reference herein for all purposes. The above references to U.S. patents in all sections of this application are herein incorporated by references in their entirety for all purposes. Components, methods, tools, materials illustrated and/or disclosed in such patents may be utilized with embodiments herein. Incorporation by reference is discussed, for example, in MPEP section 2163.07(B).

The above references in all sections of this application are herein incorporated by references in their entirety for all purposes. All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed. The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above-described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A disc nucleus replacement assemblage for insertion and for assembly in a row extending across a space defined by and within an annulus fibrosis of a human spine after removal of the nucleus pulposus, the assemblage comprising:
   a plurality of modular disc implant segments, wherein at least one of the plurality of implant segments comprises:
   a central base portion having two opposing lateral sides, a posterior side, an anterior side, a superior side, and an inferior side, formed of a rigid polymer,
   a superior compressible spring lobe unitary with and extending upwardly from the central base portion, the superior compressible spring lobe comprising a superior C-shaped exterior wall portion connecting to the central base portion at an anterior-superior corner and extending in an anterior direction therefrom, and the superior C-shaped exterior wall portion connecting to the central base portion at a posterior-superior corner and extending in a posterior direction therefrom, an outer surface of the superior C-shaped exterior wall defining the outermost margin of the implant segment above the central base portion, the superior C-shaped exterior wall portion and superior side of the central base portion defining an open interior of the superior compressible spring lobe with a plurality of spring arms therein;
   an inferior compressible spring lobe unitary with and extending downwardly from the central base portion, the inferior compressible spring lobe comprising a C-shaped exterior wall portion connecting to the central base portion at an anterior-inferior corner and extending in an anterior direction therefrom, and the inferior C-shaped exterior wall portion connecting to the central base portion at a posterior-inferior corner and extending in a posterior direction therefrom, an outer surface of the C-shaped exterior wall defining the outermost margin of the implant segment below the central base portion, the inferior C-shaped exterior wall portion and inferior side of the central base portion defining an open interior of the inferior compressible spring lobe with a plurality of spring arms therein;
   wherein the superior compressible spring lobe is connected to the inferior compressible spring lobe only by way of the central base portion; and
   wherein the central base portion having an insertion facilitating portion at a posterior side of the central base portion and with an access space open posteriorly to the insertion facilitating portion between a posteriorly projecting portion of the superior lobe and a posteriorly projecting portion of the inferior lobe.

2. The disc nucleus replacement assemblage of claim 1, wherein when the at least one of the plurality of implant segments is viewed laterally each of the open interiors of each of the superior and inferior spring lobes respectfully have a plurality of separated voids, each void defined by one or more of the respective plurality of spring arms, the respective exterior wall portion, and/or an interiorly facing surface of the central base portion.

3. The disc nucleus replacement assemblage of claim 1, wherein each of the plurality of spring arms of the at least one of the plurality of implant segments extend to and are unitary with the respective C-shaped exterior wall portion and/or the central base portion.

4. The disc nucleus replacement assemblage of claim 1, wherein when viewed laterally, a posterior-anterior width of the at least one of the plurality of implant segments taken through a middle of the central base portion is less than the posterior-anterior maximum width of the implant segment taken through the superior compressible spring lobe and is less than the posterior-anterior maximum width of the implant segment taken through the inferior compressible spring lobe.

5. The disc nucleus replacement assemblage of claim 1, wherein the central base portion of the at least one of the plurality of implant segments has a minimal circumference in a horizontal plane that is less than the maximum circumference of superior compressible spring lobe through a horizontal plane and is less than the maximum circumference through a horizontal plane of the inferior compressible spring lobe of the implant segment.

6. The disc nucleus replacement assemblage of claim 1, wherein when viewed laterally, each of the respective C-shaped exterior wall portions of the at least one of the plurality of implant segments extend from the central base portion in a posterior direction or in an anterior direction and then curve to a superior or inferior direction.

7. The disc nucleus replacement assemblage of claim 1, wherein insertion facilitating portion of the central base portion of the at least one of the plurality of implant segments comprises a threaded opening for receiving an implant tool, the threaded opening extending in a anterior direction into the central base portion.

8. The disc nucleus replacement assemblage of claim 1, wherein when assembled and viewed from above, the assembly provides an exterior perimeter, and the assemblage provides a convex smooth upwardly facing continuous surface extending across the entirety of the assembly within the perimeter.

9. The disc nucleus replacement assemblage of claim 1, wherein the at least one of the plurality of implant segments comprise a plurality of intermediate implant segments and the assemblage further comprises two end implant segments, wherein when assembled the plurality of intermediate implant segments are abutting one another laterally and are placed intermediate the two end implant segments.

10. The disc nucleus replacement assemblage of claim 1, wherein each of the plurality of modular disk implant segments is formed of polyetheretherketone.

11. A disc nucleus replacement assemblage for insertion and for assembly in a row extending laterally across and within an annulus fibrosis of a human spine of a patient after removal of a nucleus pulposus for preserving motion of the spine of the patient, the assemblage, after insertion and assembly, being deflectable from lateral, anterior and/or posterior movement of the patient, the assemblage comprising:
   a plurality of modular disc implant segments, including a pair of end implant segments and a plurality of intermediate implant segments, as assembled in the spine of the patient each of the modular disk implant segments having a pair of opposing lateral sides, an anterior side, a posterior side, a superior side, and an inferior side,
   wherein each of the plurality of intermediate implant segments comprises:
   a central base portion formed of a polymer with a Youngs Modulus of greater than 3.0 GPa, the central base portion having an interconnecting portion on each of the pair of opposing lateral sides for abuttingly connecting to adjacent disc implant segments, the central base portion further having a threaded hole for receiving an implant tool, the threaded hole extending into the central base portion at the posterior side;

a superior compressible spring lobe unitary with and extending upwardly, posteriorly, and anteriorly from the central base portion, the superior compressible spring lobe having a continuous and uninterrupted exteriorly facing wall surface extending from an anterior side of the central base portion to a posterior side of the central base portion, the superior compressible spring lobe formed of the polymer with the Youngs Modulus of greater than 3.0 GPa, the superior compressible spring lobe unitary with the base portion; and an inferior compressible spring lobe unitary with and extending downwardly, posteriorly, and anteriorly from the central base portion, the superior compressible spring lobe having a continuous and uninterrupted exteriorly facing wall surface extending from the anterior side of the central base portion to a posterior side of the central base portion, the superior compressible spring lobe formed of the polymer with the Youngs Modulus of greater than 3.0 GPa, the inferior compressible spring lobe unitary with the base portion;

wherein each of the superior compressible spring lobe and inferior compressible spring lobe having a respective C-shaped exterior wall portion defining an open interior, the respective C-shaped exterior wall portions each having the respective exteriorly facing wall surface and an interiorly facing wall surface, each of the superior compressible spring lobe and inferior compressible spring lobe further having a respective plurality of spring members within the respective open interior resisting compression of the respective spring lobe.

12. The disc nucleus replacement assemblage of claim 11, wherein each of the respective plurality of spring members in the superior compressible spring lobe, and each of the respective plurality of spring members in the inferior compressible spring lobe, of each of the plurality of intermediate implant segments, are unitary with the respective central base portion.

13. The disc nucleus replacement assemblage of claim 11, wherein each spring member has a length of at least 6.0 mm.

14. The disc nucleus replacement assemblage of claim 11, wherein, when viewed laterally, each of the intermediate implant segments have an I-shape.

15. The disc nucleus replacement assemblage of claim 11, wherein when assembled the assemblage provides a convex smooth upwardly facing surface that is uninterrupted with openings between the two end implant segments, and a convex downwardly facing surface that is uninterrupted with any openings between the two end implant segments, a posteriorly facing surface and an anteriorly facing surface each with an elongate central recess extending laterally from one end disk implant segment to an opposite end disk segment.

16. The disc nucleus replacement assemblage of claim 11, wherein each of the intermediate implant segments have a pair of interconnecting portions, and each of the pair of end implant segments have a respective single interconnecting portion.

17. The disc nucleus replacement assemblage of claim 16, wherein each of the interconnecting portions is configured as a dovetail joint portion.

18. The disc nucleus replacement assemblage of claim 11, wherein each of the C-shaped exterior wall portions has a thickness of less than 2.0 mm.

19. A disc nucleus replacement assemblage comprising a plurality of modular disc implant segments for insertion and for abutting assembly in a row extending laterally across and within an annulus fibrosis of a human spine of a patient after removal of a nucleus pulposus for preserving motion of the spine of the patient, the assemblage, after insertion and assembly, being deflectable from lateral, anterior and/or posterior movement of the patient;

wherein the plurality of modular disc implant segments include two end implant segments and a plurality of intermediate implant segments for placement between the two end implant segments, as assembled in the spine of the patient each of the plurality of modular disc implant segments having a pair of opposing lateral sides, a posterior side, and an anterior side, wherein each of the plurality of intermediate implant segments comprises:

a central base portion formed of a polymer with a Youngs Modulus of greater than 3.0 GPa, the central base portion having a pair of interconnecting portions positioned on opposing lateral sides of the central base portion for connecting to adjacent disc implant segments, and a threaded hole for receiving an implant tool positioned on an outwardly exposed posterior sidewall of the central base portion;

a first compressible spring lobe unitary with and extending upwardly from the central base portion, the first compressible spring lobe formed of the polymer with a Youngs Modulus of greater than 3.0 GPa, the spring lobe having a C-shaped exterior wall portion defining an open interior, the C-shaped exterior wall portion having an exteriorly facing wall surface and an interiorly facing wall surface;

a second compressible spring lobe unitary with and extending downwardly from the central base portion, the second compressible spring lobe spaced from the first compressible spring lobe by the central base portion, the second compressible spring lobe formed of the polymer with a Youngs Modulus of greater than 3.0 GPa, the second compressible spring lobe having a C-shaped exterior wall portion defining an open interior, the C-shaped exterior wall portion having an exteriorly facing wall surface and an interiorly facing wall surface.

20. The disc nucleus replacement assemblage of claim 19, wherein each of the plurality of intermediate implant segments comprises an internal spring member extending upwardly with respect to the central base portion into the open interior of the first compressible spring lobe and an internal spring member extending downward with respect to the central base portion into the open interior of the second compressible spring lobe.

* * * * *